Figure 1:
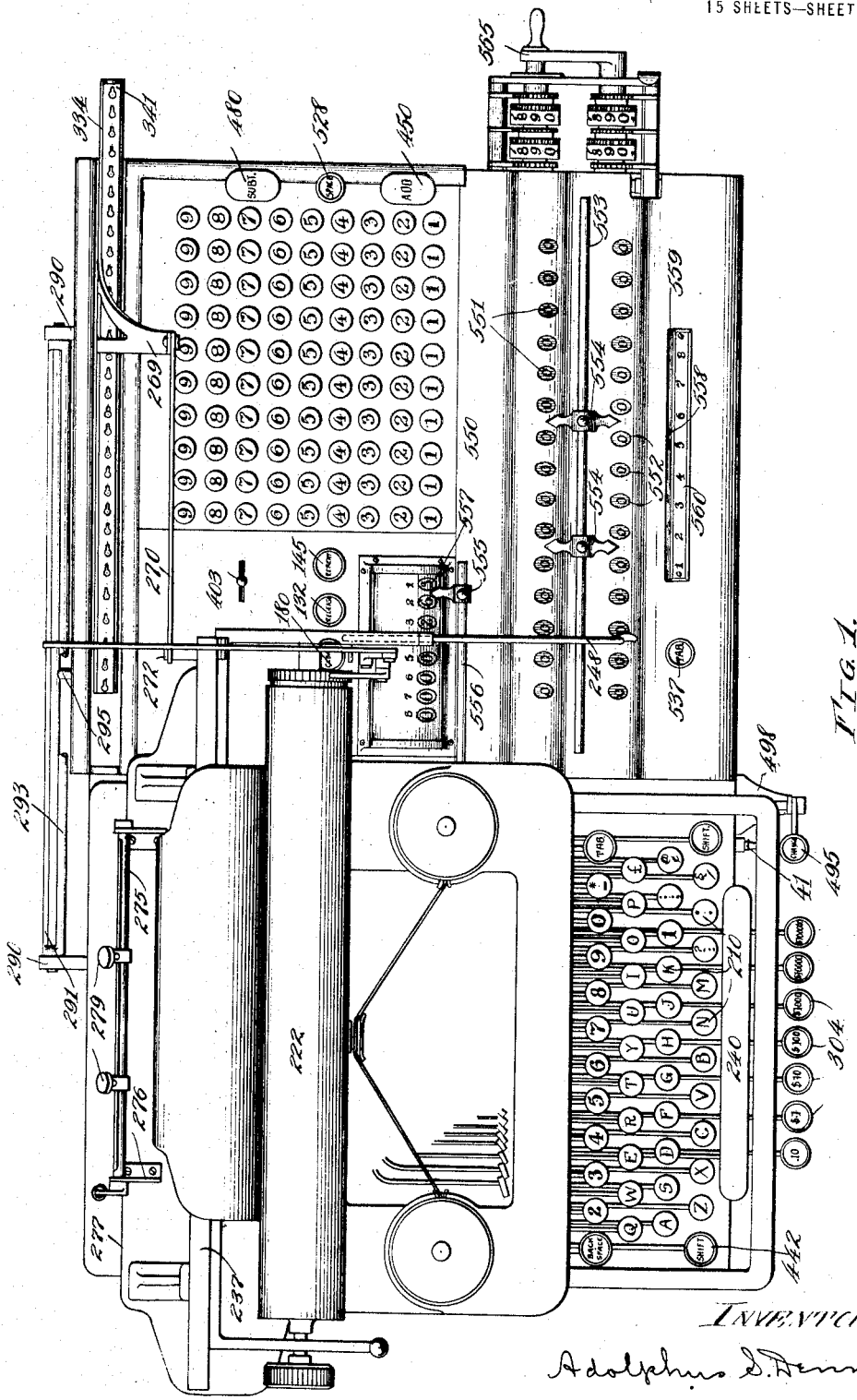

A. S. DENNIS.
COMBINED TYPE WRITER AND CALCULATING MACHINE.
APPLICATION FILED NOV. 2, 1915.

1,309,276.

Patented July 8, 1919.
15 SHEETS—SHEET 1.

INVENTOR,
Adolphus S. Dennis
BY Hull, Smith, Brock & West
ATT'YS.

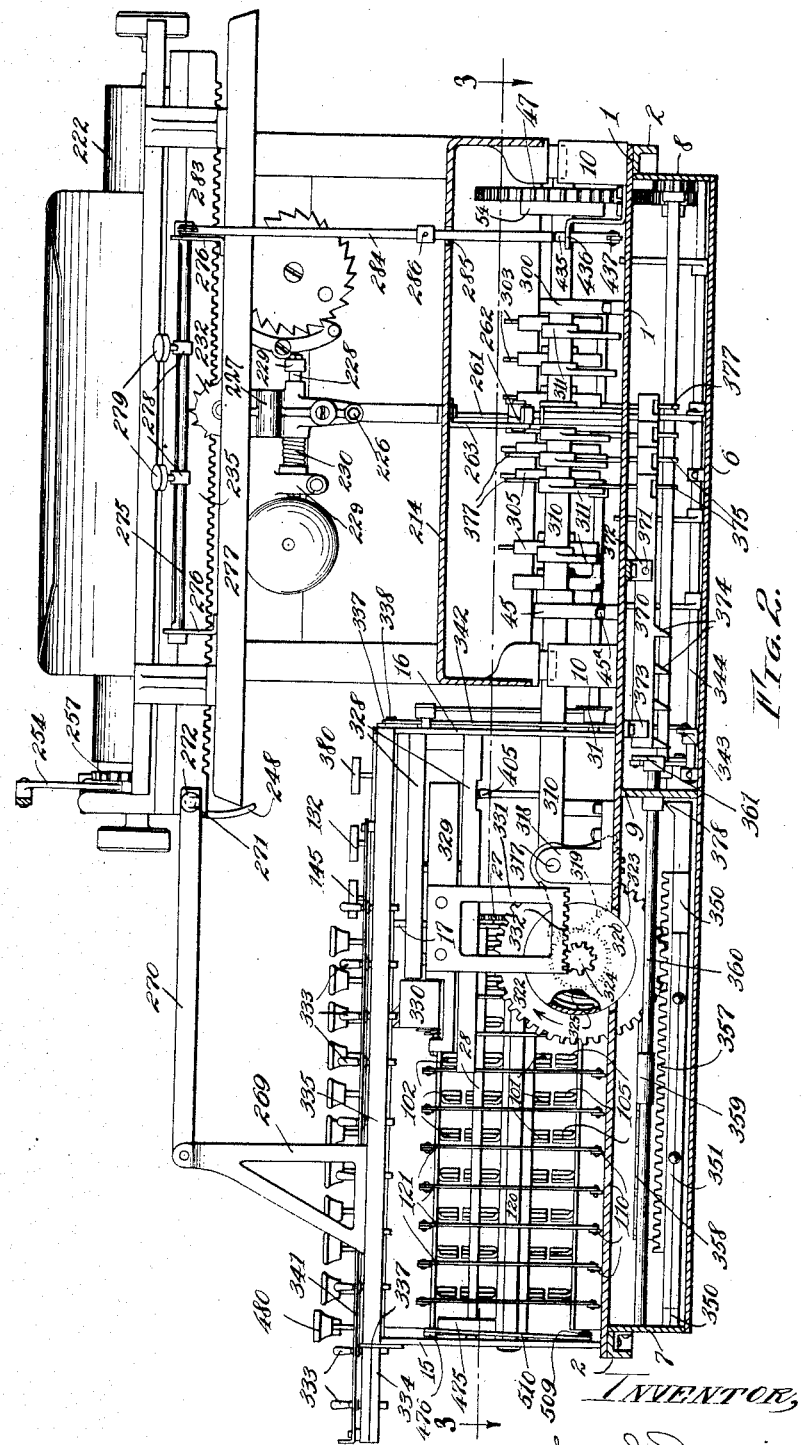

A. S. DENNIS.
COMBINED TYPE WRITER AND CALCULATING MACHINE.
APPLICATION FILED NOV. 2, 1915.
1,309,276.
Patented July 8, 1919.
15 SHEETS—SHEET 3.
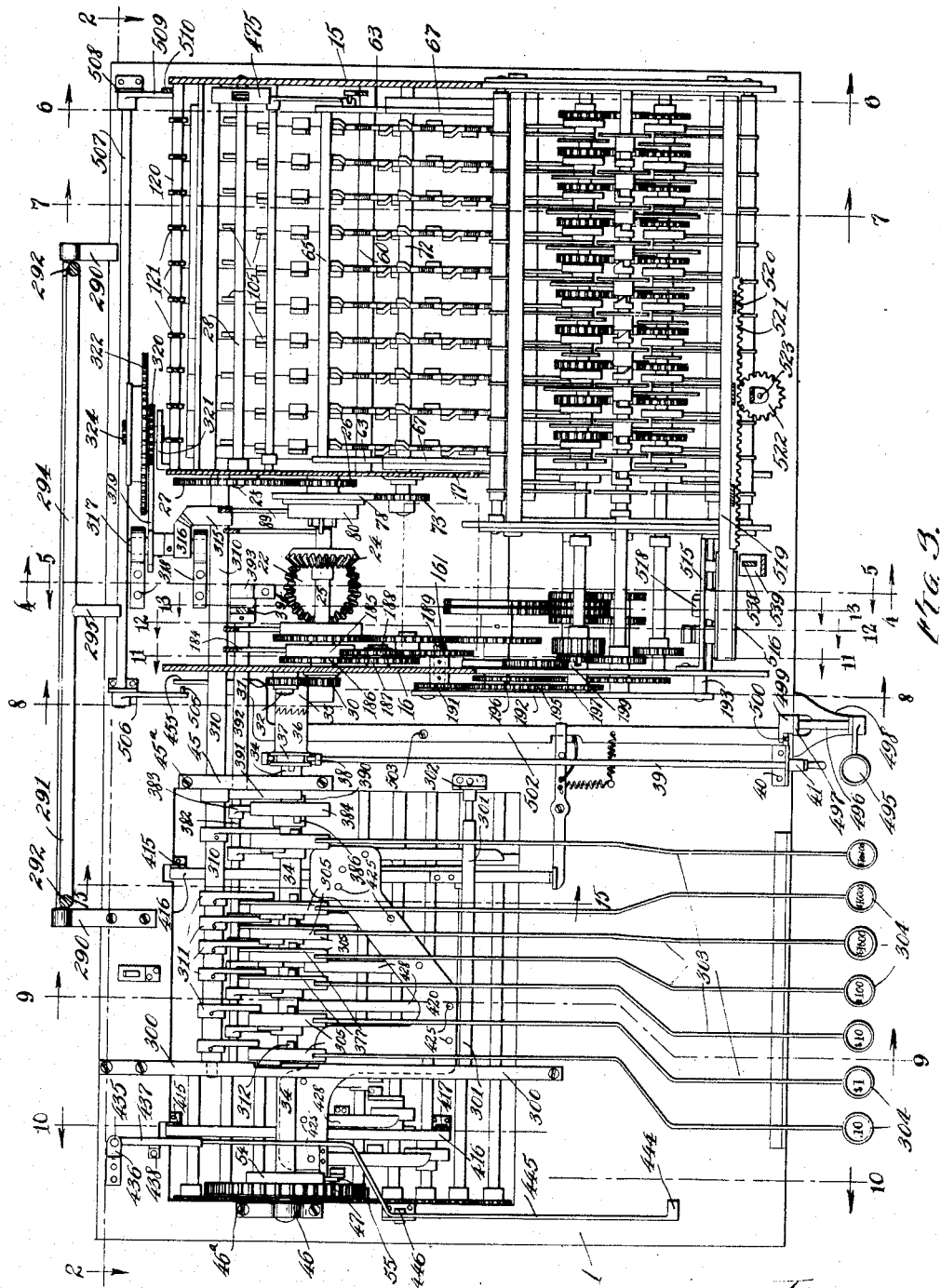

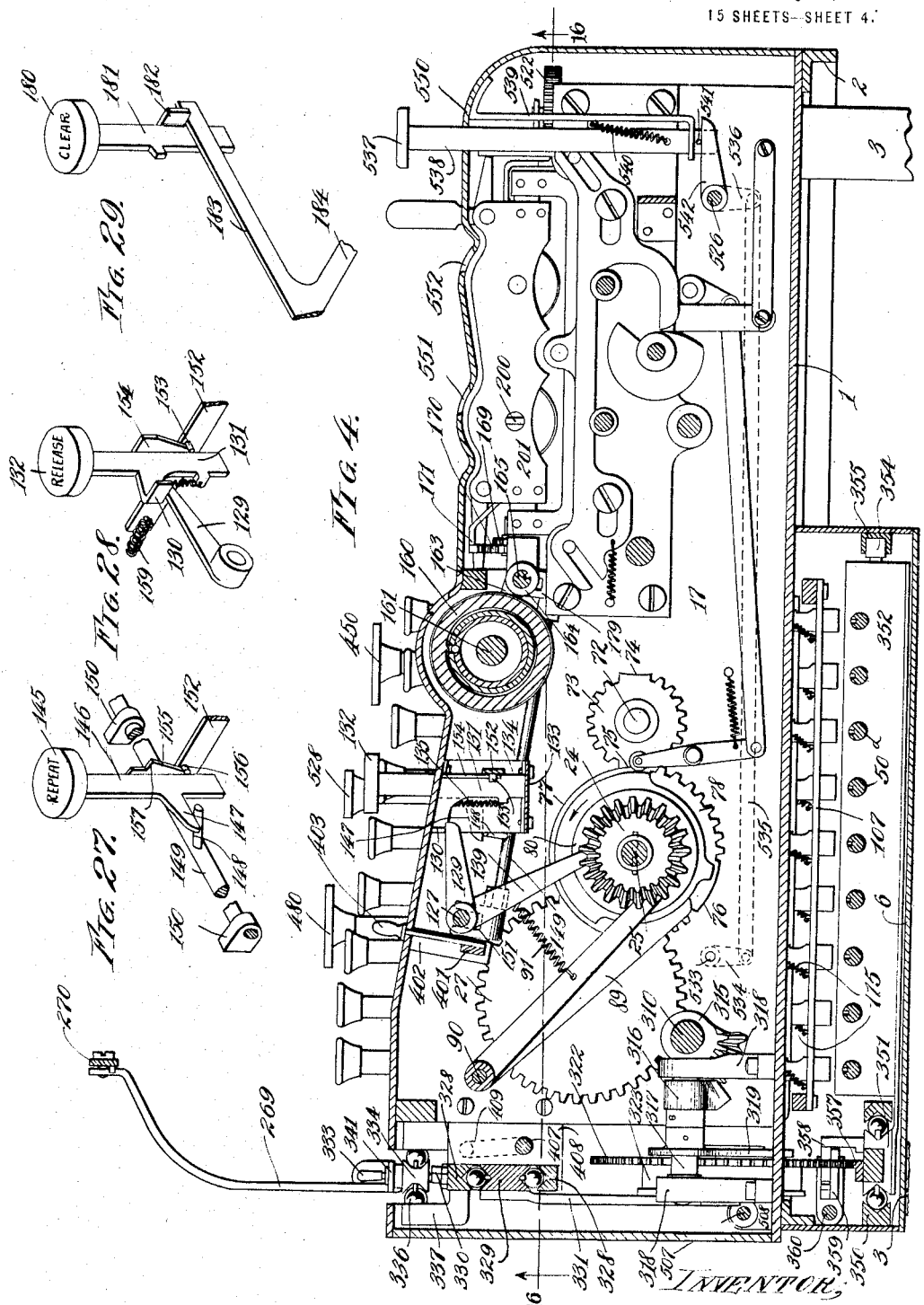

A. S. DENNIS.
COMBINED TYPE WRITER AND CALCULATING MACHINE.
APPLICATION FILED NOV. 2, 1915.
1,309,276.
Patented July 8, 1919.
5 SHEETS—SHEET 5.
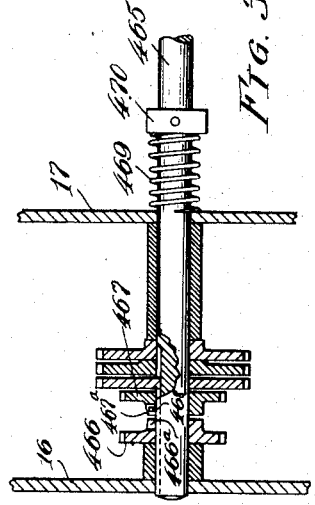
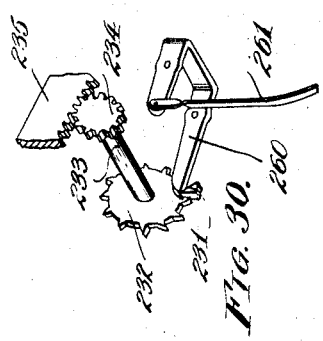
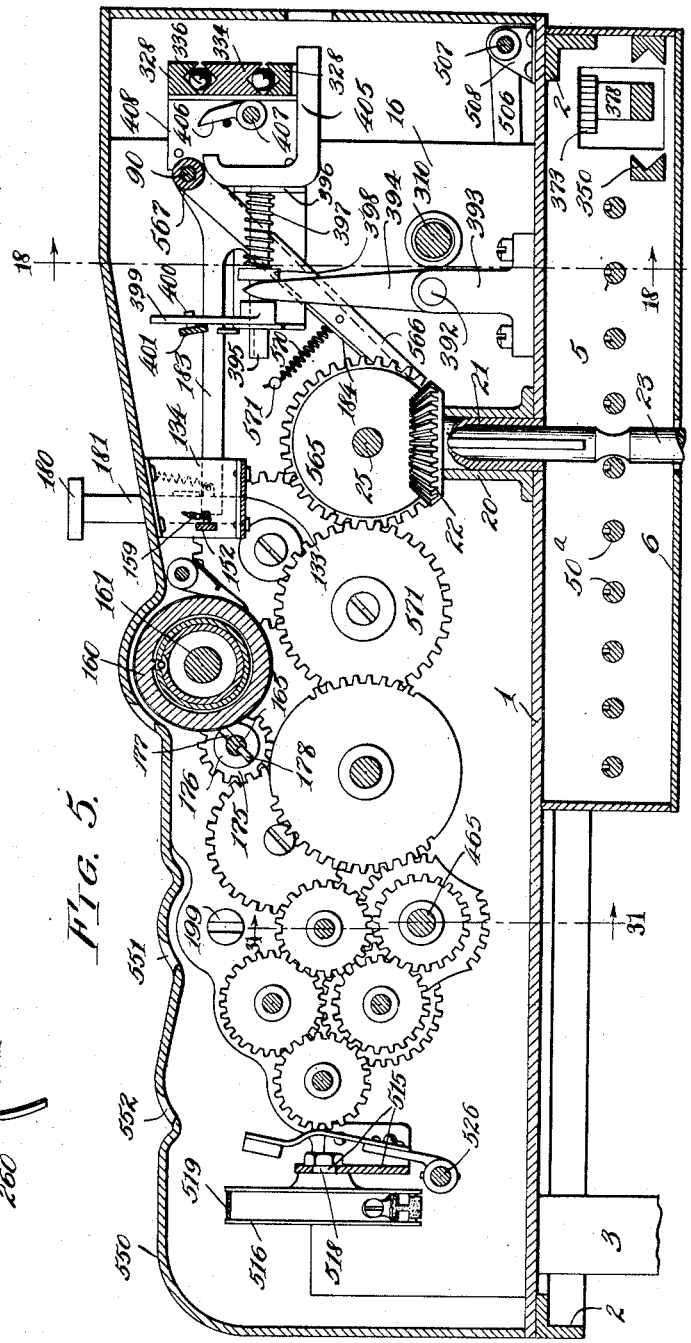

A. S. DENNIS.
COMBINED TYPE WRITER AND CALCULATING MACHINE.
APPLICATION FILED NOV. 2, 1915.

1,309,276.

Patented July 8, 1919.
15 SHEETS—SHEET 6.

INVENTOR,
Adolphus S. Dennis.
BY Hull, Smith, Brock & West.
Attys.

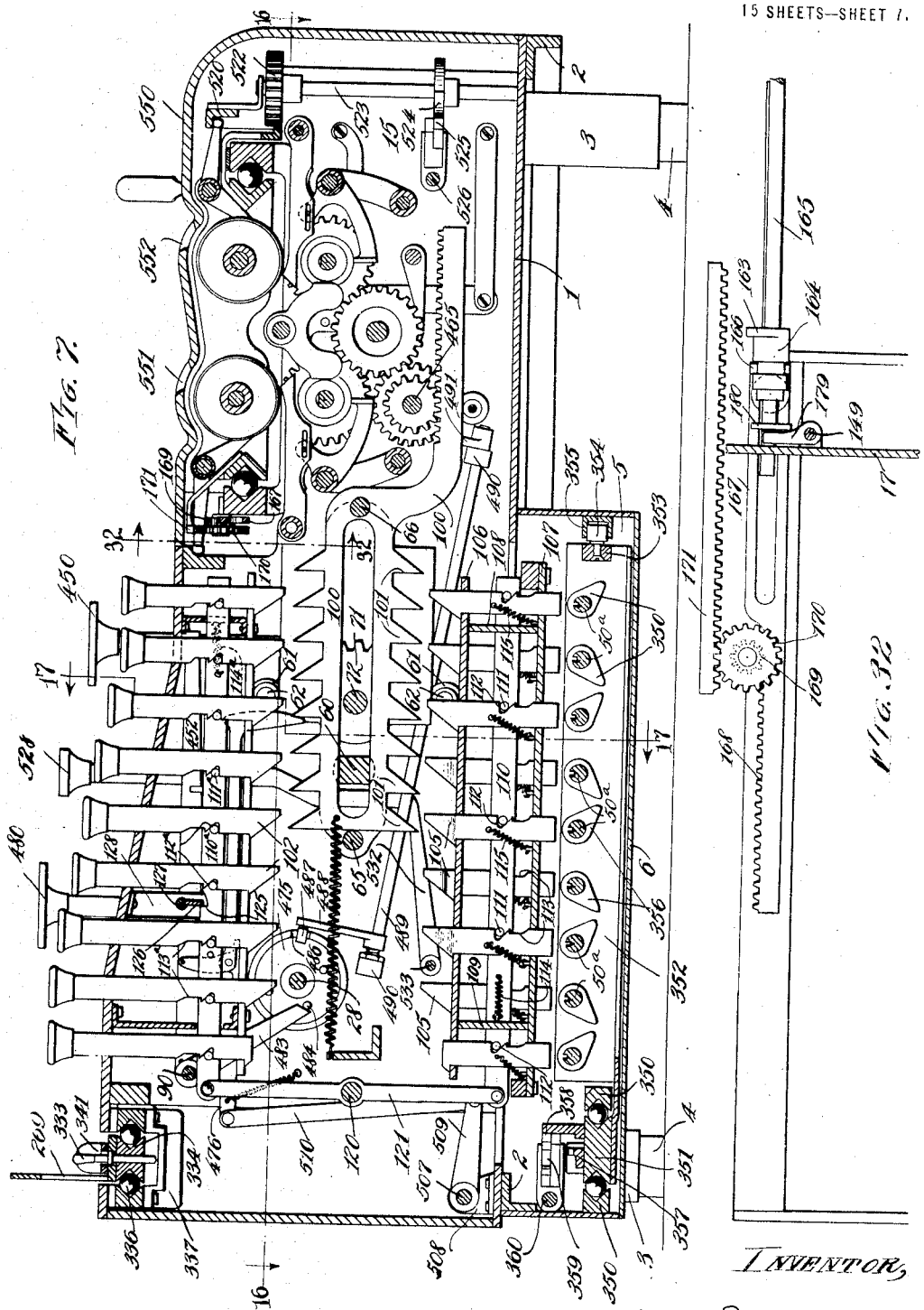

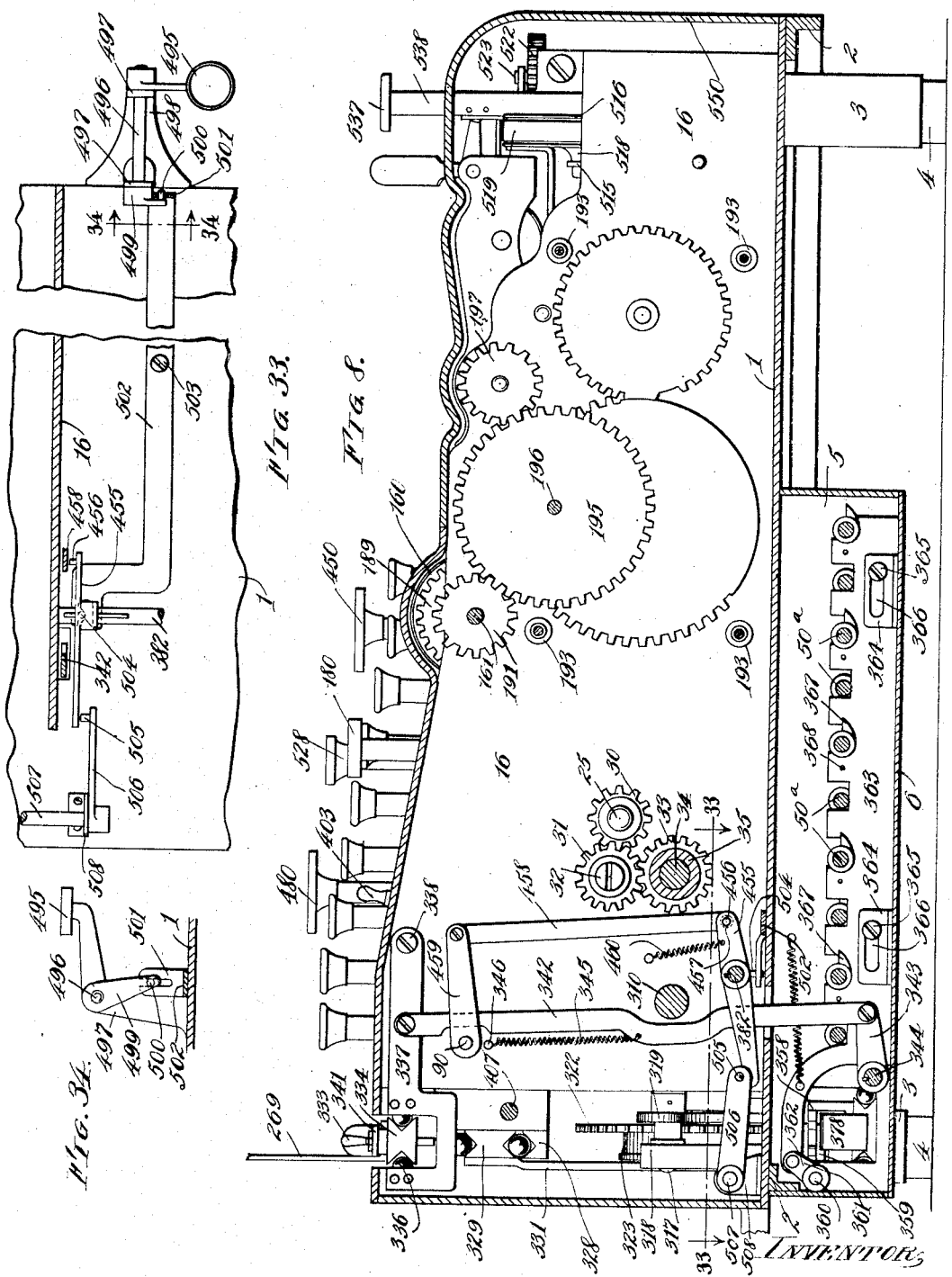

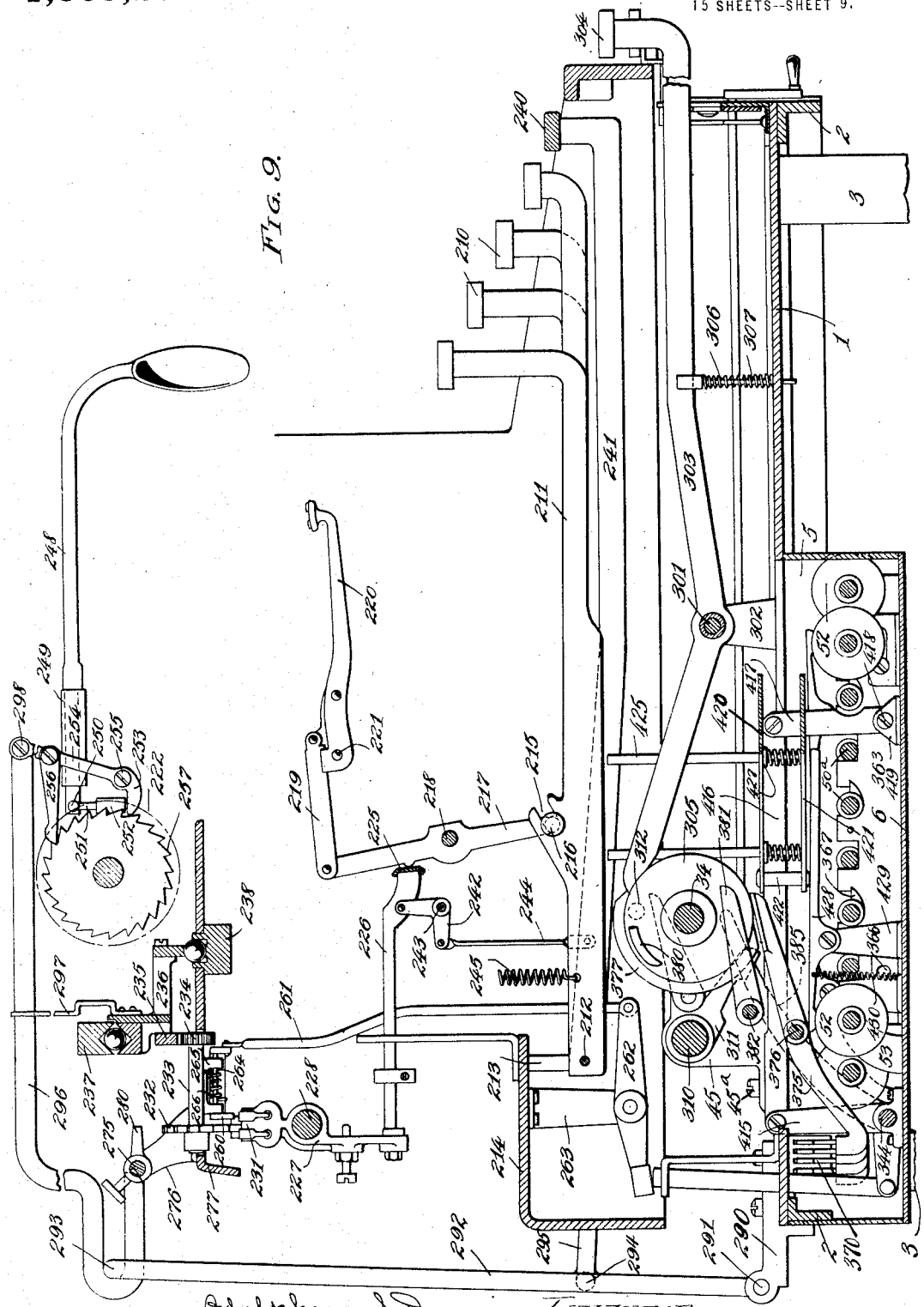

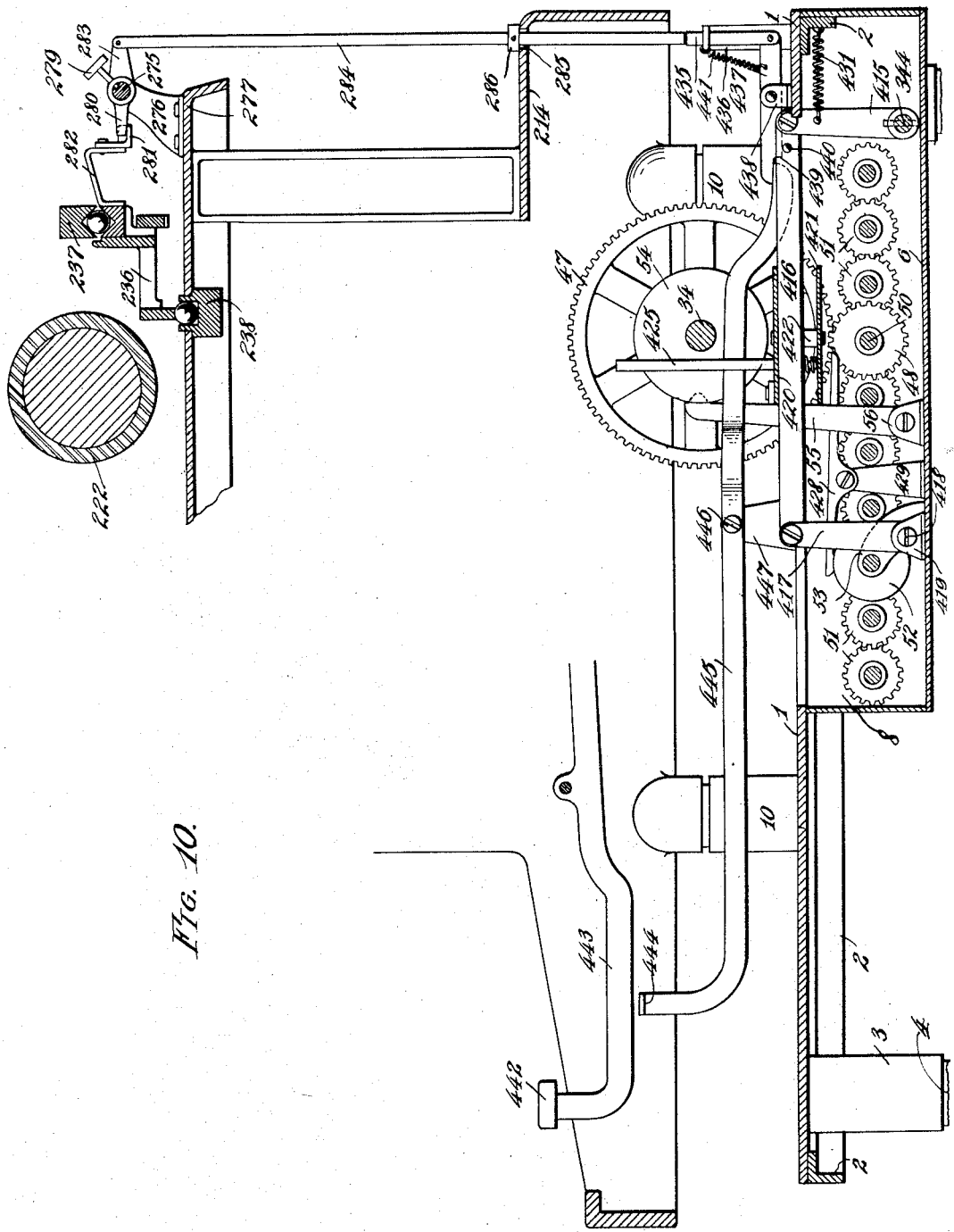

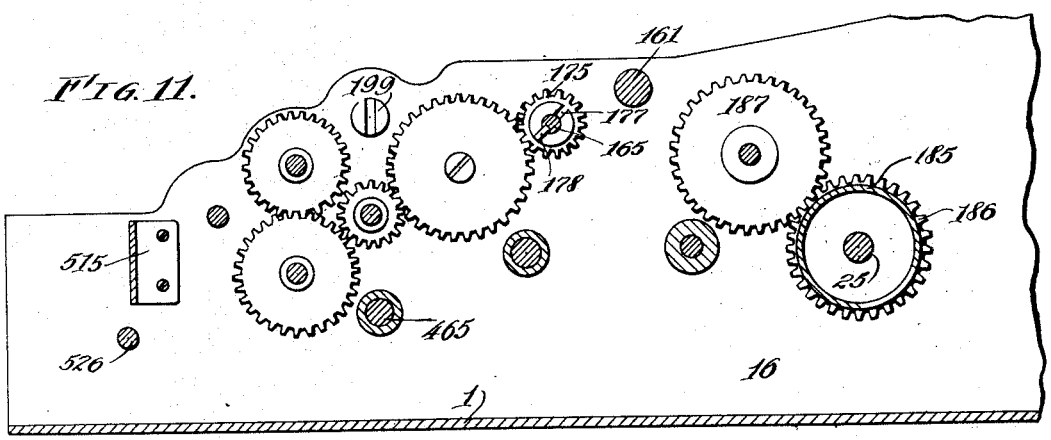
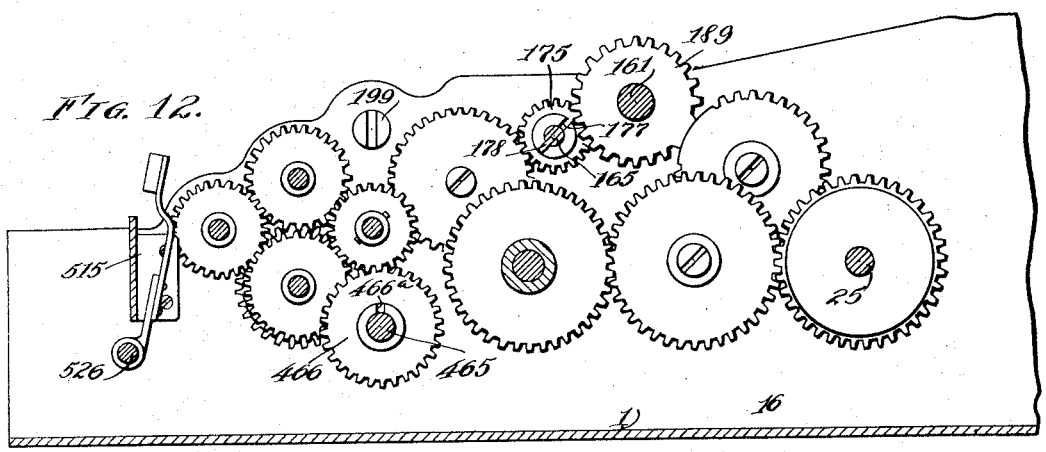
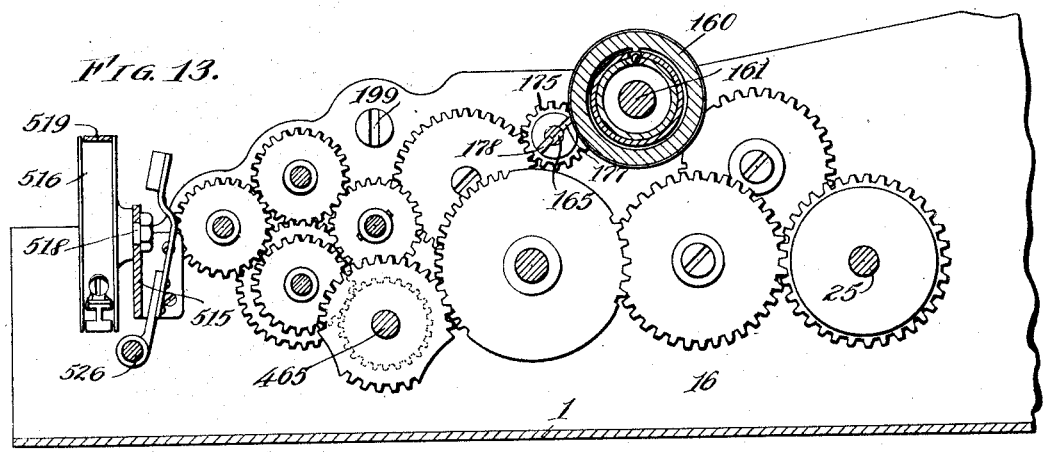

A. S. DENNIS.
COMBINED TYPE WRITER AND CALCULATING MACHINE.
APPLICATION FILED NOV. 2, 1915.

1,309,276.

Patented July 8, 1919.
15 SHEETS—SHEET 12.

INVENTOR,
Adolphus S. Dennis

By Hull, Smith, Brock & West
ATTYS.

A. S. DENNIS.
COMBINED TYPE WRITER AND CALCULATING MACHINE.
APPLICATION FILED NOV. 2, 1915.
1,309,276.
Patented July 8, 1919.
15 SHEETS—SHEET 13.
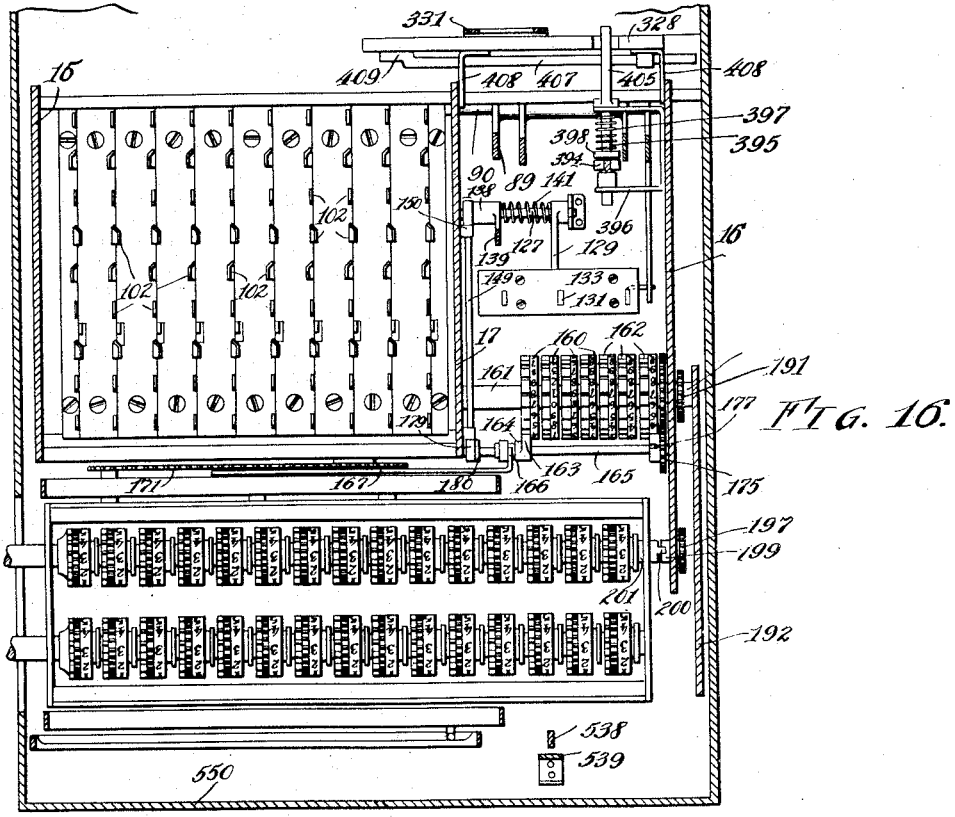
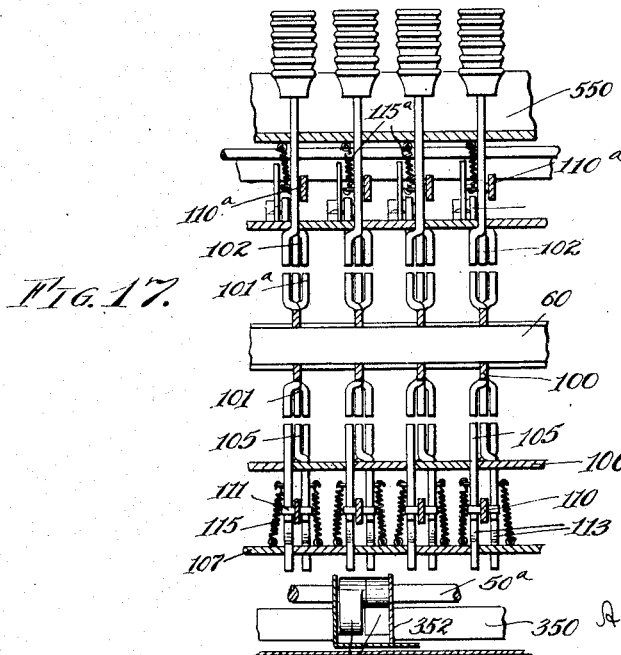

A. S. DENNIS.
COMBINED TYPE WRITER AND CALCULATING MACHINE.
APPLICATION FILED NOV. 2, 1915.

1,309,276.

Patented July 8, 1919.
15 SHEETS—SHEET 14.

INVENTOR,
Adolphus S. Dennis
BY Hull, Smith, Brock &West
ATT'YS.

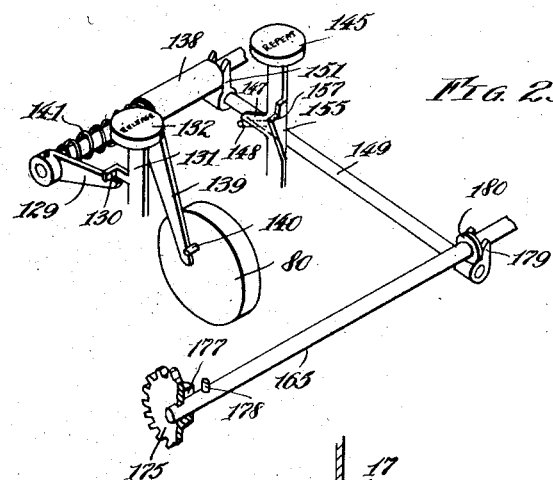
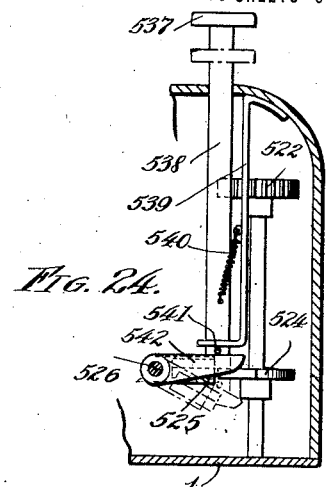
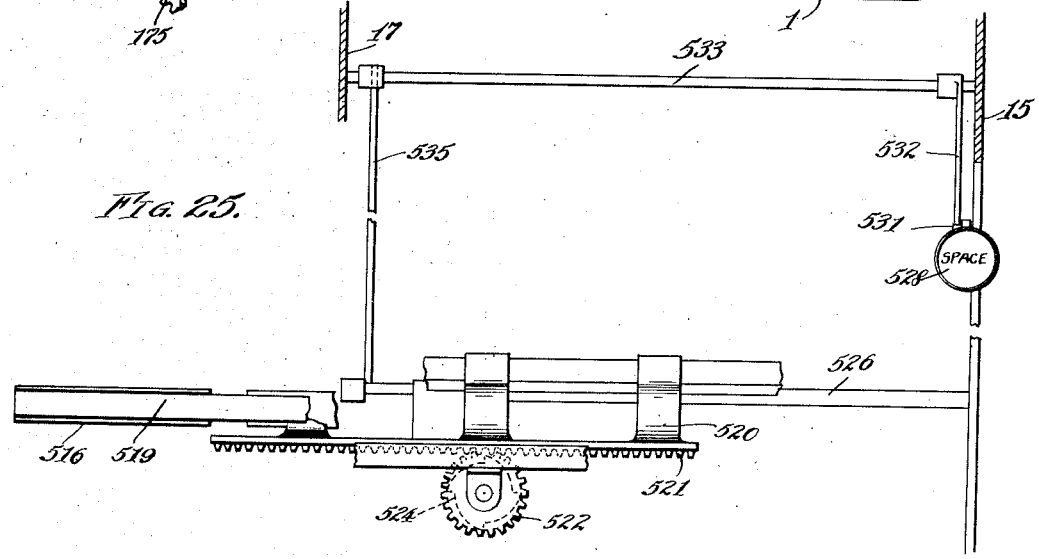
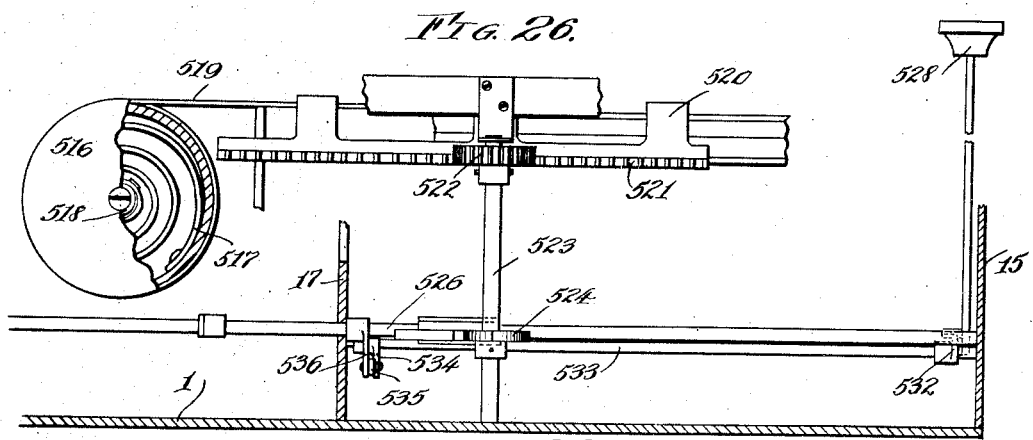

UNITED STATES PATENT OFFICE.

ADOLPHUS S. DENNIS, OF CLEVELAND, OHIO, ASSIGNOR TO MARCHANT CALCULATING MACHINE COMPANY, A CORPORATION OF CALIFORNIA.

COMBINED TYPE-WRITER AND CALCULATING-MACHINE.

1,309,276.   Specification of Letters Patent.   Patented July 8, 1919.

Application filed November 2, 1915. Serial No. 59,238.

*To all whom it may concern:*

Be it known that I, ADOLPHUS S. DENNIS, a citizen of the United States, residing at Cleveland, in the county of Cuyahoga and State of Ohio, have invented a certain new and useful Improvement in Combined Type-Writers and Calculating-Machines, of which the following is a full, clear, and exact description, reference being had to the accompanying drawings.

This invention relates to a combined typewriter and calculating machine, and it has for its general object the production of a combination of this character wherein the typewriter may be used entirely independently of the calculating machine, and vice-versa; and when desired, and with slight exertion on the part of the operator, the two machines may be operatively coupled together for joint work so that while a series or column of numbers is being written by the typewriter, the sum of such numbers is being accumulated by the calculating machine.

A further object of the invention is the provision of a common base, whereon the calculating machine is preferably permanently mounted, and by which the typewriter may be removably supported, said base carrying or containing the transmitting mechanism through which the two machines coöperate. One purpose of this construction is to allow the typewriter to be withdrawn from the combination by merely lifting it off the base, if, in peculiar cases, it should be found more convenient to use the typewriter removed from the calculating machine, although it should be borne in mind that its connection with the calculating machine does not, in any way, interfere with its ordinary use. To this end the transmitting mechanism is so constructed and arranged that the mere placing of the typewriter upon the base renders the combination in readiness for joint work.

The invention further provides for extreme simplicity in the adaptation of a typewriter of standard design and construction to the combination; and it may be explained in this connection that, in the embodiment of my invention herein shown and described, I have employed a model of what is known as the L. C. Smith typewriter; and the calculating machine of the present combination embraces all the essentials of the calculating machine disclosed in my application for United States Letters Patent, Serial Number 51,302, filed September 18, 1915. Therefore in the drawings and throughout the following description I will go no further into detail in showing and describing those parts which constitute no part of my present invention than is deemed necessary to give a clear understanding to the case at hand.

Other objects comprehended by my invention are the provision of means for automatically clearing or returning to zero or normal position the indicating wheels of the counter and computing head of the calculating machine; and the provision of novel escapement and control mechanism for the calculating machine carriage.

In addition to the foregoing, other more specific objects will become apparent as this description proceeds, and to the attainment of these ends my invention may be defined as consisting of the combinations of elements set forth in the claims annexed hereto and illustrated in the accompanying drawings which form a part hereof and wherein similar reference characters are used to designate corresponding parts throughout the several views.

Drawings.

Figure 14:
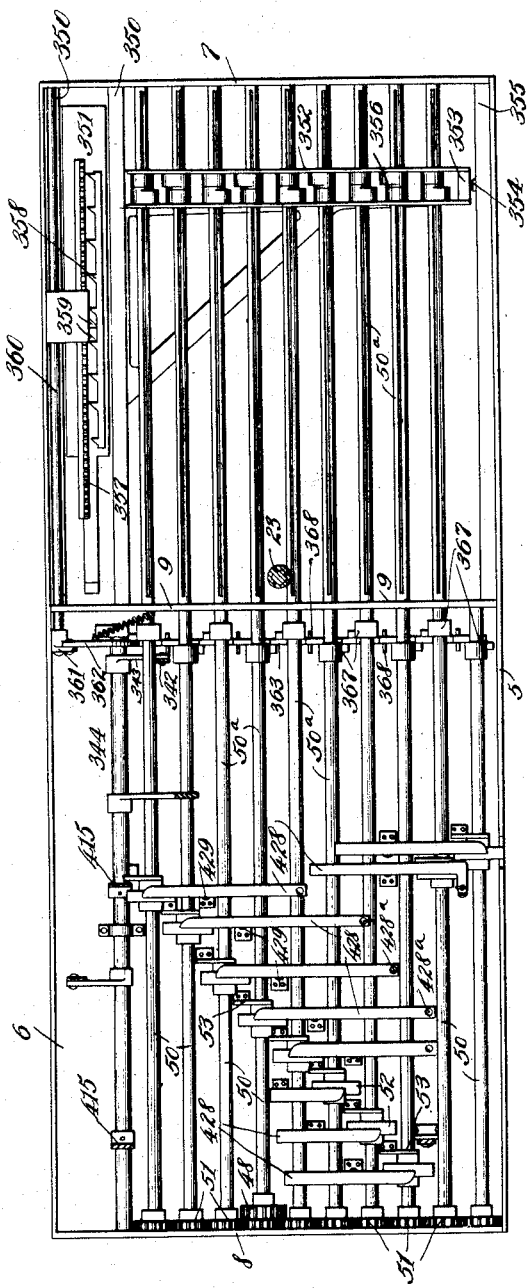
Figure 15:
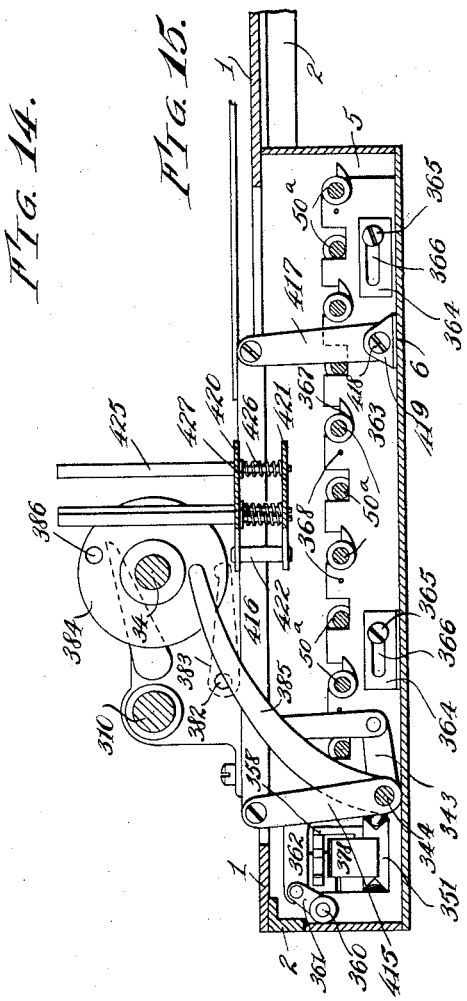
Figures 18, 19:
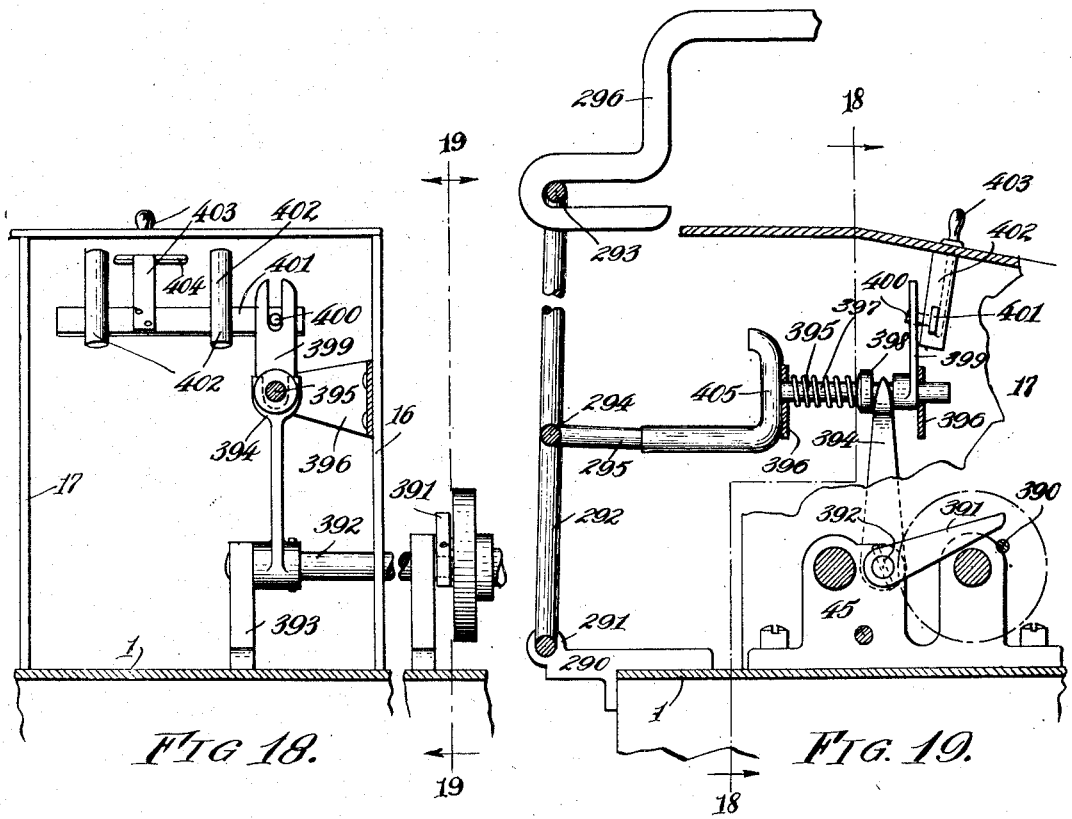
Figure 20:
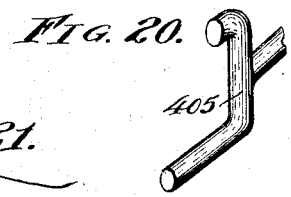
Figure 21:
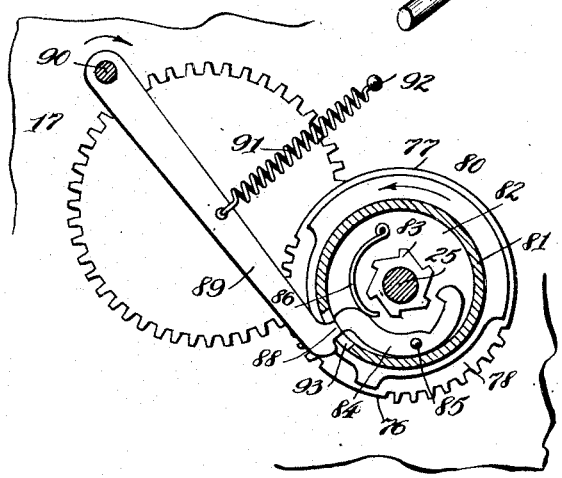
Figure 22:
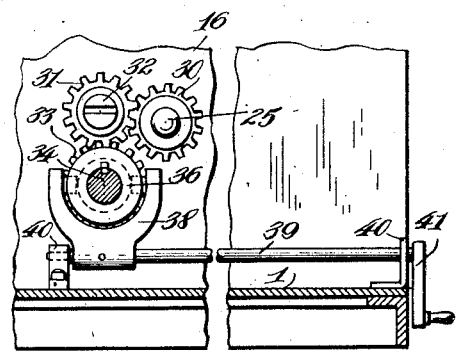

In the drawings, Figure 1 is a plan view of the combined typewriter and calculating machine; Fig. 2 is a sectional rear elevation of the machine; Fig. 3 is a sectional plan taken approximately on the line 3—3 of Fig. 2; Figs. 4 and 5 are vertical sectional views, from front to rear, on the line 4—5 of Fig. 3, the former being taken as looking toward the right and the latter, as looking toward the left hand end of the machine; Fig. 6, 7, 8, 9 and 10 are similar views on the correspondingly numbered lines of Fig. 3, the various views being taken as looking in the direction indicated by the arrows of their respective section lines; Figs. 11, 12 and 13 are sectional details on the lines 11—11, 12—12 and 13—13, respectively, of Fig. 3; Fig. 14 is a plan view of mechanism actuated by the typewriter keys, for operating the keys of the calculating machine; Fig. 15 is a section through the typewriter end of the machine, as indicated by the line 15—15 of Fig. 3; Fig. 16 is a horizontal sectional view through the calculating machine, immediately below the manual and the calculating head thereof, as indicated by the line 16—16 of Figs. 4 and 7, the view being taken as looking upward; Fig. 17 is a vertical section, transverse of the upper and lower key banks of the calculating machine, on the line 17—17 of Fig. 7; Figs. 18, 19 and 20 are details of mechanism for automatically imparting either a transverse movement to the typewriter carriage, or a rotary movement to the top thereof, from the operating part of the calculating machine, the first of said figures being taken on the line 18—18 of Figs. 5 and 19; Fig. 21 is a sectional detail of the main clutch; Fig. 22, a detail of the mechanism for making and breaking the operative connection between the typewriter and the calculating machine; Fig. 23 is a perspective view showing the relation between the "release" and "repeat" keys of the calculating machine, and mechanism operated thereby; Fig. 24 is a fragmentary section through the calculating machine adjacent the carriage release key; Figs. 25 and 26 are a fragmentary plan and front elevation, respectively, of the escapement mechanism of the calculating machine carriage; Figs. 27, 28 and 29 are perspective views, respectively, of the "repeat", "release" and "clear" keys of the calculating machine; Fig. 30 is a similar view of a rocking frame associated with the escapment mechanism of the typewriter; Fig. 31 is a sectional detail on the correspondingly numbered line of Fig. 5; Fig. 32 is a section on the line 32—32 of Fig. 7, and shows the mechanism through which the "step-by-step" movements of the calculating machine carriage are transmitted to the actuating finger of the counter; Fig. 33 is a detail of the "change" key actuated mechanism, whereby the calculating machine is caused either to add or multiply, or to divide or subtract; and Fig. 34 is a section on the line 34—34 of Fig. 33.

*The frame.*

(Reference numerals 1 to 17.)

The base plate 1 of the machine (Figs. 2 and 4 to 10) may comprise an integral casting having a depending peripheral flange, or it may be built up, as shown in the drawings, of a plate to which the numeral 1 is applied, and to the underneath side of which is secured, adjacent its edges, angle bars 2. The base plate is supported by four legs 3, one of which is located at each corner of the plate, inside the angle bars 2, and the lower end of each leg is provided with a cushion 4, preferably of soft rubber, which may be attached to the leg by having its upper end inserted into a socket formed in the bottom of the leg.

Suspended from the underneath side of the base plate 1, (Figs. 2, 4 to 10, 14 and 15) and extending from end to end thereof, and from its rear edge beyond its transverse center, is a rectangular, shallow casing, shown in plan in Fig. 14, and comprising a bottom 6, end walls 7 and 8, and a middle wall 9 (see Fig. 2).

Four posts 10 (Figs. 2 and 10) rise from the left hand end of the base plate (for the purpose of this description, it being assumed that the machine is viewed from the front when making reference to the right or left hand ends of the machine) and are arranged to support the typewriter above, and properly locate it with respect to the mechanism wherewith it is intended to coöperate. The upper ends of the posts 10 may be recessed for the reception of the feet of the typewriter.

Rising from the end of the base plate remote from that over which the typewriter is adapted to stand, is the right hand end plate 15 (Fig. 3) of the calculating machine; and the left hand end plate 16 thereof rises from the base plate a little to the right of the right hand pair of posts 10, or at about the longitudinal center of the base plate. Parallel to and located between the plates 15 and 16, is what will be referred to as the intermediate plate 17, said plate being situated somewhat nearer the plate 16 than the plate 15.

The foregoing are the main parts of the frame of the machine, and the subsidiary parts, such as brackets and the like, will be included when the parts are described wherewith they are associated.

*Description of driving mechanism.*

(Introducing parts 20 to 56.)

Journaled within a sleeve or boss 20 which rises from the base plate 1, between the left hand end plate 16 and the intermediate plate 17, is the elongated hub 21 of a bevel gear 22 (see Fig. 5). The gear 22 is keyed, or otherwise secured, to the vertically disposed shaft 23 that passes downward through the bottom 6 of the previously described casing 5, and said shaft may be driven by any suitable means, such as a motor (not shown). Meshing with the bevel gear 22, is a similar gear 24 (see Figs. 3 and 4) that is fastened to a shaft 25, journaled in the plates 16 and 17, and projecting some distance beyond the left hand side of the former. Adjacent the plate 17, the shaft 25 has secured to it a spur gear 26 that meshes with a larger gear 27 that is fastened to the end of a shaft 28. As is shown clearly in Fig. 3, the shaft 28 is journaled in the right hand end plate 15 and the intermediate plate 17. Where the shaft 25 projects beyond the left hand side of the plate 16, it has fixed to it a gear 30 which drives, through an idler 31, that is journaled upon a stud 32, projecting from the plate 16, a gear 33 (see Figs.

3 and 8). The last mentioned gear is rotatably supported upon the end of a shaft 34, but is not permitted to move longitudinally of the same. Such connection may be made in any well known manner. The circular face of the hub 35 of the gear 33 is serrated to form the face of one member of a dental clutch, the other member 36 thereof constituting a sleeve having a complementary face and splined to the shaft 34. The end of the member 36 opposite its clutch face, is provided with a groove 37 into which projects, at diametrically opposite points, the trunnion of a shifting fork 38 that is fastened to a shaft 39 (see Fig. 22). The shaft 39 is supported a slight distance above the base plate 1, in brackets 40, and to the forward end of the shaft there is applied an operating handle 41, whereby said shaft may be oscillated to rock the fork 38 and shift into and out of mesh with the other member, the member 36 of the clutch.

The shaft 34 is journaled in brackets 45 and 46 (Figs. 2, 3, 9 and 19), the former being located adjacent the clutch 36, and the latter, near the left hand end of the machine. The brackets 45 and 46 may be securely fastened to the base plate by means of screws 45ª and 46ª, respectively.

A gear 47 is loosely mounted upon the shaft 34 (Figs. 3 and 10), adjacent the bracket 46, and meshes with a gear 48 that is fastened to one of the shafts 50 of a series that have their opposite ends journaled in the end walls 7 and 8 of the casing 5, and which pass through the middle wall 9. All the shafts 50 are geared together through the pinions 51 that are secured to the respective shafts and are located just inside the aforesaid end wall 8.

It will be explained briefly at this time, and more fully hereinafter, that the shafts 50 are divided intermediate their ends, and the abutting ends of the sections of each shaft are held in alinement and adapted to be operatively connected by a clutch, designated generally by the reference numeral 52. The shafts are supported adjacent said clutches by brackets 53 that rise from the bottom wall 6 of the casing 5. For convenience of description, the sections of the shaft to the right of the clutches 52 (see Fig. 14) will be referred to as the shafts 50ª.

While the machine is in use, the shafts 23, 25 and 28 are constantly driven, as is also the shaft 34, provided the member 36 of the previously mentioned dental clutch is in effective position. The various sub-mechanisms of the machine are driven from one or the other of the aforesaid shafts upon the actuation of the clutches through which such mechanisms are operatively connected to their respective driving shafts.

The gear 47 is adapted to be operatively connected to the shaft 34, through a clutch 54 (Figs. 3 and 10) which has one of its elements attached to the shaft and the other to the gear. The operation of the clutch 54 is controlled by a latch arm 55, pivoted to a bracket 56 that rises from the bottom wall 6 of the casing 5. The parts which coöperate with the latch arm 55 to release the clutch 54 will be described farther along.

*Rack restoring mechanism.*

(Introducing parts 60 to 78.)

Figure 6:
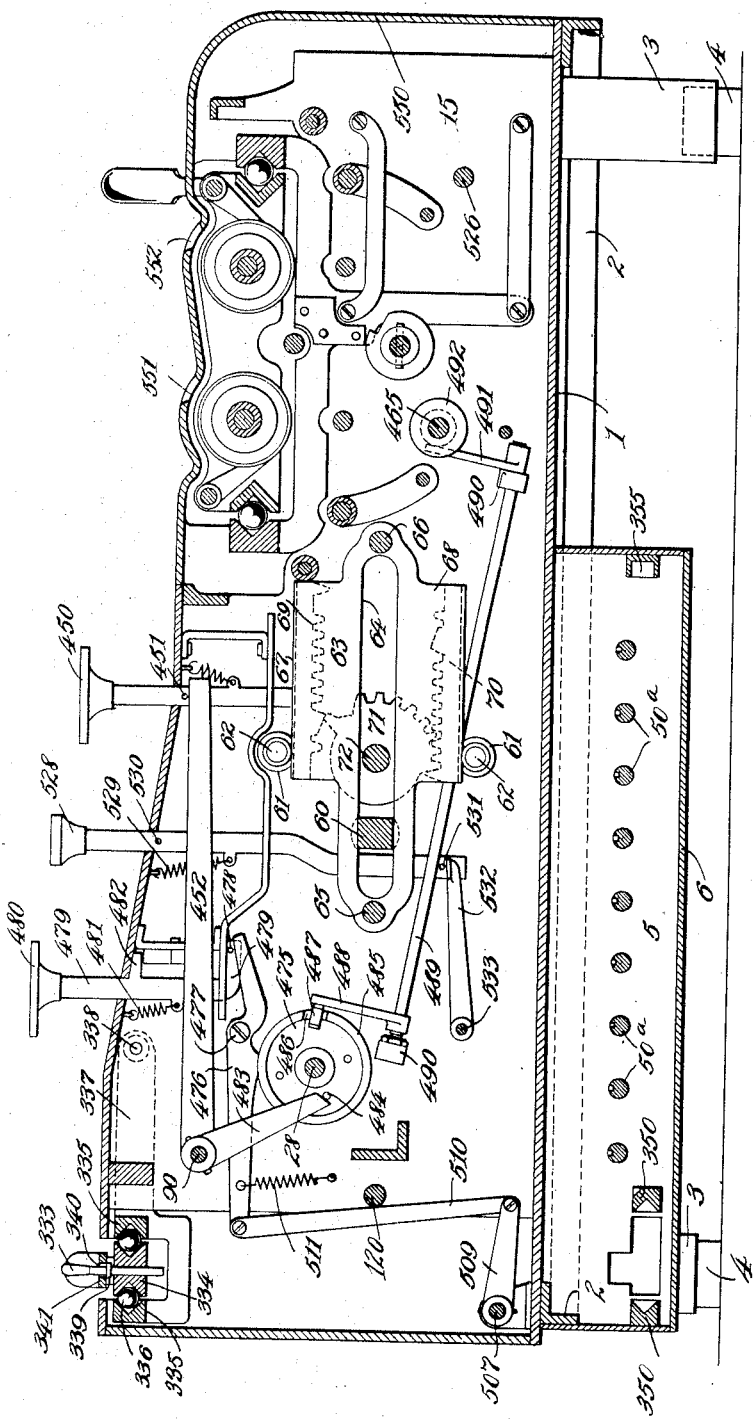

Supported rigidly by and between the right hand end plate 15 and the intermediate plate 17 of the calculating machine, is a beam 60, having flattened front and rear sides and curved upper and lower sides, as shown in Figs. 6 and 7. The latter sides of the beam are provided with a series of transverse grooves. Guided upon each end of the beam 60, and also between rollers 61 which are carried upon studs 62, that project inwardly from the respective right hand end plate 15 and the intermediate plate 17, is a rack restoring frame which comprises two end plates 63, that are slotted at 64; and the edges of the plates which define the sides of said slots are guided in grooves in the upper and lower sides of the beam 60. The corresponding ends of the aforesaid plates 63 are connected by tie rods 65 and 66. The forward ends of the side plates 63 have upwardly and downwardly extending enlargements or wings 67 and 68, respectively, and each of these wings 67 and 68, carries a rack on its surface that is adjacent the respective end or intermediate plate of the machine, the upper and lower racks being shown, respectively, at 69 and 70, in Fig. 6. It will be noted from an inspection of said figure, that the racks are of peculiar formation and that each is arranged to coöperate with a mutilated gear 71 that is secured to the end of a shaft 72 which is journaled in the right hand end plate 15 and the intermediate plate 17, through the latter of which said shaft projects and beyond which it is provided with a gear 73 (see Fig. 4) that has two smooth spots 74 and 75 for coöperation with the smooth portions 76 and 77 of a mutilated gear 78 which is carried by the casing of the main clutch, shown in detail in Fig. 21.

*The main clutch.*

(Fig. 21, parts 80 to 93.)

The clutch just referred to is indicated generally at 80, and is mounted upon the shaft 25 adjacent the intermediate plate 17. The casing of the clutch comprises a cylindrical wall 81, the ends of which are closed by the circular walls 82. Between the ends or circular walls of the casing, the shaft 25 has secured to it a ratchet 83 with the teeth whereof is adapted to coöperate the nose of a pawl 84 which is pivoted at 85 to one of the circular walls of the clutch casing. A spring 86, which is carried by the same wall to which the pawl 84 is pivoted, bears against the tail of the pawl and tends to rock the pawl in a direction to cause its nose to engage the teeth of the ratchet 83. The projection 88 of an arm 89, that is pinned or otherwise secured to a shaft 90, presently to be described, is arranged to coöperate with the tail of the pawl 84 and, under the influence of a spring 91, which has one of its ends connected to the aforesaid arm 89 and its other end anchored to the intermediate plate 17, at 92, swing said pawl upon its pivot and remove its nose from the teeth of the ratchet 83, the projection 88 engaging the tail of the pawl through the slot 93 in the cylindrical wall of the clutch casing.

From the foregoing description it will be seen that, when the shaft 90 is oscillated in the direction indicated by the arrow in Fig. 21, the projection 88 of the arm 89 will be moved from the tail of the pawl 84, allowing the spring 86 to rock said pawl upon its pivot 85 and to project the nose of the pawl into engagement with one of the teeth of the ratchet 83. As a result of this the clutch will be locked to the rotating shaft 25 and said clutch, with its gear 78, will be driven in a direction indicated by the arrows in Figs. 4 and 21. During approximately the first quarter turn of the gear 78, the gear 73 will be given one-half a rotation, when the smooth portion 76 of the gear 78 will pass over the smooth portion 74 of the gear 73. Thereafter, the next toothed portions of the gears 78 and 73 will mesh and another half rotation will be imparted to the gear 73. The intermittent movement thus imparted to the shaft 72, to which the gears 73 and 71 are attached, will cause the mutilated gear 71 to rotate in like manner and move the rack restoring frame toward the rear of the machine, and, after a slight dwell there, return it to normal position.

All of the clutches employed in the machine, including the one designated 54 already mentioned (and excepting the dental clutch, previously described) are substantially the same as the main clutch just described, so that in referring to the remaining clutches, they will be referred to only in a general way and by a single reference numeral.

*Mechanical control for the actuating mechanism of the indicating wheels.*

(Introducing parts 100 to 121.)

In practically every respect, the indicating wheels, and the mechanism whereby they are driven, the carriage whereon the indicating wheels are mounted, and the manually operated keyboard for controlling the actuating mechanism of the indicating wheels, are the same in my present machine as in the machine described and shown in my former application above referred to; so that in this description the aforesaid parts will be referred to only in connection with the elements which are peculiar to this machine and wherewith such parts are associated; and in all particulars where said parts differ, to any material degree, from the corresponding parts of the former machine, such differences will be specifically pointed out.

The spring actuated rack bars 100 (Fig. 7), whereby the indicating wheels are rotated through suitable transmission gear, are practically identical to those shown in the above mentioned application, the only difference being that the present rack bars are provided with a series of depending, staggered lugs 101, which lugs may be considered duplicates of the lugs which rise from the upper edge of the rack bars and wherewith the lower ends of the manually operated key stems coöperate.

Particularly from Fig. 7 it will be seen that there is located within the lower portion of the calculating machine, directly beneath the manually operated key board, a battery of vertically movable stops 105, which resemble the stems of the manually operated keys, and are arranged to coöperate with the depending lugs 101 of the rack bars 100. It may be stated at this time, that the values which these stops represent, correspond to those of the manually operated keys, and progress successively from 1 to 9 from front to rear, the valuation of the manually operated keys being clearly shown by the numerals which such keys bear, as illustrated in Fig. 1. The staggered arrangement of the lugs 101, the lower ends of the manually operated keys, and the upper ends of the stops 105, is well shown in Fig. 17, and the object of such an arrangement is clearly set forth in my former application. It will be noted particularly from Fig. 17, that while the various stems of each bank of keys 102 is in the same plane, the adjoining stops 105 are offset laterally from each other for a purpose which will be explained presently. However, when any one of the keys 102 is depressed, or any one of the stops 105 elevated, it will permit the rack 100 that is located above it to be moved back under the influence of its spring until said key or stop is engaged by the proper lug of said rack, thereby to stop the rack, and consequently the indicating wheels, at a point corresponding to the value of such key or stop.

The stops 105 (Fig. 7) are guided within suitable apertures in the upper and lower plates 106 and 107, respectively, of a frame wherein the stops are movably supported. The plates 106 and 107 may be made up of a plurality of sections of strips that have their forward and rear edges connected by the members 108 and 109, respectively.

Guided between the opposed sides of the offset stops 105 of each bank, is a stop bar 110 (Fig. 7), that is guided within the members 108 and 109. Each of these bars carries a plurality of stop pins 111 for coöperation with the notches 112 and 113, in the forward edges of the stops 105. It will be noted that the former of the aforesaid notches is deeper than the latter, and that it has its lower side inclined, so that upon the elevation of a key, such inclined side of the notch will act as a cam to advance the stop bar 110, through the respective pin 111, forwardly against the tension of the spring 114 that has one of its ends attached to the bar, and its opposite end to the member 109. 115 are springs which connect the stops 105 to the lower plate 107 of the guide frame and tend to depress the stop. When a stop is elevated, it is retained in elevated position against the tension of the spring 115 by the occupancy of its notch 113 by its respective stop pin 111. Attention is called to the fact that the manually operated keys 102 are provided with equivalents of the parts refered to by the reference numerals 110 to 115, and said corresponding parts of the keys 102 are designated by the same reference numerals, augmented by the exponent "a." It will be observed, however, that the notches 112$^a$ and 113$^a$ of the keys 102 are located in the rear edges of such keys. Therefore, when moved to release any of these keys, the stop bars 110$^a$ will necessarily have to move in a direction opposite to that of the stop bars 110 of the stops 105.

120 is a bar which is supported by and between the right hand end plate 15 and the intermediate plate 17 (see Figs. 7, 2 and 3). Rocker arms 121 are mounted upon the bar 120, and the lower ends of said arms are pivotally connected to the rear ends of the lock bars 110, while the upper ends of said arms are similarily connected to the corresponding ends of the upper stop bars 110$^a$. Therefore, a rearward movement of any of the stop bars 110$^a$ is transmitted to the lower corresponding stop bars and converted into a forward movement of the latter.

Release key.

(Parts 125 to 141.)

Coöperating with the rear vertical walls of notches 125 (Fig. 7) that are formed in the upper edges of the stop bars 110$^a$, is the fin 126 of a rock shaft 127, the right hand end of which is journaled in a bracket 128, depending from and secured to the top of the machine; and the left hand end of said shaft projects through the intermediate plate 17 (see Figs. 4 and 16), and has secured to it, an arm 129, the free end of which is adapted to be engaged and depressed by a lug 130 that projects rearwardly and then laterally from the stem 131 of the release key 132. The stem of the release key is guided within suitable apertures formed in the top plate of the machine, and in the plate 133 that is spaced below and supported from the aforesaid plate by end plates 134. A spring 135 tends to elevate said key. From the foregoing, it will be seen that, upon the depression of the release key, the shaft 127 will be oscillated to cause its fin 126 to move rearwardly and slide all of the stop bars 110$^a$ in a corresponding direction, to remove their stop pins 111$^a$ from the notches of the stems of the keys 102, and should there be any keys that are depressed within any of the banks of the key board, such operation will release said keys and permit them to return to their normal position under the influence of their respective springs. Upon the rearward movement of the stop bars 110$^a$, the lower stop bars 110 will be moved forwardly through the intervention of the rocker arms 121, and release any of the stops 105 which may have been locked in elevated position by the stop pins 111.

Splined to the shaft 127, between the intermediate plate 17 and the arm 129, is the sleeved hub 138 of an arm 139 (Figs. 4 and 23) which extends down alongside the casing of the main clutch 80 in the path of a pin 140 carried thereby. A compression spring 141 upon the shaft 127 and confined between the hub of the arm 139 and that of the arm 129, tends to retain said arm in the path of the pin 140. Therefore, under normal conditions, upon each rotation of the clutch 80 the shaft 127 will be oscillated to release any of the keys 102 or stops 105 that may have been respectively depressed or elevated. From the foregoing it will be seen that both manually and mechanically operated means are provided for releasing the keys and stops.

Repeat key.

(Parts 145 to 158.)

It is found necessary, in some uses of the machine, as in multiplication and division, to repeat the members represented by the depressed keys or elevated stops, and therefore to retain such keys or stops in operative position until the calculation is finished.

For this purpose there is provided what is termed the "repeat key", shown in perspective in Figs. 23 and 27, and designated 145. The stem 146 of the repeat key has a projection 147 for coöperation with a pin 148 that extends from the side of a rock shaft 149, supported on brackets 150, from the intermediate plate 17. The rear end of the shaft 149 has secured to it a fork 151 which embraces the shaft 127 and bears against the right hand end of the hub 138 of the arm 139. Upon the depression of the repeat key and the consequential oscillation of the shaft 149, the fork 151 will be moved to slide the hub 138 against the tension of the spring 141 and move the arm 139 out of the path of the pin 140. Therefore, during the subsequent rotations of the clutch 80 and the actuations of the calculating mechanism dependent thereon, the keys or stops which are depressed or elevated, respectively, will remain in effective position and the numbers which they represent will be repeated.

Guided within slots in the end plates 134, is a bar 152 (see Figs 4, 5, 23, 27 and 28) and a pin 153 which projects laterally from the rear side of the bar is adapted to be engaged by the inclined surface of a cam 154 which projects laterally from the forward edge of the stem 131 of the release key 132. Bearing the same relation to a similarly shaped cam 155 which extends in the same direction as the cam 154 and from the forward edge of the stem of the repeat key 145, is a pin 156, that is carried by the aforesaid bar 152. It will be noted that the upper end of the cam 155 is notched to form a shoulder 157 over and into engagement with which the pin 156 is permitted to pass when the repeat key is depressed. A spring 159 tends to move the bar 152 in a direction to bring about the above results.

It is obvious from the foregoing description that, when the repeat key is depressed, it is retained in such position by the stop pin 156 engaging the shoulder 157; and that, upon the depression of the release key, the bar 152 will be shifted against the tension of its spring to remove the pin 156 from the shoulder 157, thereby to release the repeat key.

*Counter.*

(Introducing parts 160 to 179.)

The counter (Figs. 4, 5, 13 and 16) comprises a series of indicating wheels 160, which are mounted side by side along a shaft 161, that is supported by and between the end plate 16 and the intermediate plate 17. Each indicating wheel has a star wheel 162 with which is adapted to coöperate a finger 163, having an elongated hub 164 splined to the shaft 165, the opposite ends of which are slidably mounted within the aforesaid plates 16 and 17. The hub 164 of the finger 163 is grooved circumferentially for the reception of a fork 166 that is carried at the end of a rack bar 167 (see Fig. 32), the rack 168 whereof meshes with a pinion 169 that is carried by a larger pinion 170, driven by a rack 171 of the carriage of the calculating machine. Therefore, as is very clearly pointed out in my former application already referred to, the actuating finger 163 is moved successively from one to the other of the star wheels 162, by the "step-by-step" movement of the calculating machine carriage.

Inasmuch as it is desirous to have the counter operate only during such calculations as multiplication and division, or when the repeat key is depressed, an arrangement is provided whereby the actuating finger 163 is rotated only when the repeat key is depressed. The arrangement whereby this result is accomplished will now be described.

Mounted loosely upon the end of the shaft 165, adjacent the end plate 16, is a pinion 175 having a hub that is provided with a notch 177 (see Figs. 5 and 23). A pin 178, radiating from the shaft 165 is adapted to be moved into the notch 177 when said shaft is slid longitudinally. From Fig. 16, and also especially from Fig. 23, it will be seen that the shaft 165 is slid, upon the depression of the repeat key, by the engagement of a fork 179 with a collar 180 that is fastened to the shaft 165, adjacent its end remote from the pinion 175, the fork 179 being fastened to the end of the shaft 149 that is oscillated when the repeat key is depressed, as already explained.

Upon each actuation of the calculating machine, the pinion 175 is given a rotation by gearing shown in Figs. 11 to 13 and fully described in my application above referred to.

It will be mentioned in connection with the counter, that the indicating wheels thereof are arranged to be "set to zero" by a single rotation of the shaft 161, through mechanism forming no part of my present invention, but clearly set forth in my former application; and that the same feature is incorporated in the indicating wheels of the calculating machine carriage.

*"Clear" key and mechanism controlled thereby.*

(Including parts 180 to 201).

Mechanism is employed for automatically clearing, or "setting to zero" the indicating wheels of the counter, and those of the rear set or series of the calculating machine, and said mechanism is under the control of what will be referred to as the "clear" key 180 (Figs. 5 and 29). This key is located alongside the release key, and its stem 181 is guided within the top plate of the machine and the plate 133 (Figs. 4 and 16) that is suspended therefrom through the plates 134, and said key is provided with a lateral extension 182 that engages an arm 183, that is loosely mounted upon the shaft 90. A second arm 184, that is rigid with the arm 183, and preferably formed integral therewith, projects down alongside a clutch 185 (see Fig. 3), and coöperates with the pawl of said clutch, in a manner identical with that explained in connection with the main clutch 80. Therefore, upon the depression of the clear key, the arm 184 will be moved away from the tail of the pawl which forms a part of the clutch 185, and said clutch will be connected to and driven by the shaft 25.

A gear 186 (Fig. 3) carried by the clutch 185, meshes with a gear 187, and said gear, being locked to a gear 188 that is mounted upon the same stub-shaft as the gear 187, drives the gear 188. Meshing with the gear 188 is a gear 189 (Fig. 12) that is attached to the shaft 161 of the counter, and said shaft 161 passes through the end plate 16, and has secured to its protruding end, a gear 191 (Fig. 8). The end of the shaft 161, adjacent the gear 191, is journaled in a plate 192 (Fig. 3), that is secured to and spaced from the plate 16, by posts 193. 195 (Fig. 8) is an idler gear that is mounted upon a stud 196, projecting inward from the plate 192, and said idler gear is driven from the gear 191, as clearly shown in Fig. 8. Meshing also with the gear 195 is a pinion 197, fastened to a stub-shaft which is journaled in the plate 16 and extends therethrough, and carries on its inner end a head 199 (Figs. 3, 5, 11 to 13 and 16) that is provided with a groove for the reception of a tongue 200, on the left hand end of the shaft 201 which carries the rear set or series of indicating wheels of the calculating machine carriage.

From the foregoing description it will be seen that when it is desired to clear the counter, it is only necessary to depress the clear key, and through the gearing above described, the shaft 161 of the counter will be given a rotation to accomplish the desired end. Also it will be understood that the head 199 will be rotated, and if the carriage of the calculating machine is in its extreme left hand position, the tongue 200 of the shaft 201 will occupy the groove in the head 199 and said shaft will consequently be given a rotation to set its indicating wheels to zero.

*Typewriter.*

(Parts 210 to 298.)

The typewriter keys are shown at 210, and the key bars 211 are pivoted at 212 (see Fig. 9) to a member 213 depending from a stationary part 214 of the typewriter frame. According to the usual construction of typewriters of the make herein shown and previously named, each of the key bars is provided with an inclined slot 215 which receives a lateral projection 216 on the lower end of a lever 217, pivoted to a stationary bar 218, and the upper end of the lever 217 is connected, by a link 219, to the corresponding type bar 220, near the pivot point 221 thereof, so that when a key is depressed, the corresponding lever 217 is rocked upon its pivot to swing the type-carrying end of the appropriate type bar 220 against the platen 222.

When the upper end of the lever 217 is rocked to the rear, it engages a plate 225 that is carried by the forward end of a member 226, the opposite end of which member has connection with the lower end of a rocker arm 227, that is journaled upon a shaft 228, supported in brackets 229, from the rear of the typewriter (see Fig. 2). A spring 230 tends to rock the arm 227 in a direction to project the member 226 forwardly. The upper end of the rocker arm 227 carries the usual set of escapement pawls, shown generally at 231, which coöperate with an escapement wheel 232. The escapement wheel is fastened to a shaft 233 (Figs. 9 and 30) which carries, at its forward end, a pinion 234 that meshes with the rack 235 of the typewriter carriage 236, which is guided and partially supported by the stationary rails 237 and 238, there being a ball bearing between said rails and the opposed portion of the carriage. The space bar 240, is carried upon the end of a bar 241, similar to the previously mentioned key bars, and said bar 241 is pivoted, like the former bars, at 212. A bell crank 242 (Fig. 9) is pivoted upon a stationary rod 243, and one branch of the bell crank is pivotally connected to the member 226, while the opposite branch has connection with the bar 241, through the link 244. Thus the depression of the space bar 240 will, like the depression of any of the keys 210, actuate the carriage escapement mechanism. The various bars 211 and the bar 241 are elevated by springs 245, the lower ends of said springs being connected to the bars, while their upper ends may be anchored to any convenient stationary portion of the typewriter frame.

248 (Fig. 9) is a manually operated rock shaft that is journaled in a boss 249 of the typewriter carriage, and a pin 250 projects laterally from the rear end of the shaft 248, over the top of a plunger 251, that is slidable within a boss 252 of the carriage. The lower end of the plunger 251 rests upon the rearwardly projecting toe 253 of an arm 254, that is pivoted upon a screw 255, attached to the typewriter carriage. Some distance from its pivot point, the arm 254 has pivoted to it a dog 256 which is adapted to coöperate with the teeth of a ratchet 257, on the end of the platen 222. It will be seen from the foregoing that, when the shaft 248 is rocked to swing the pin 250 downward, the plunger 251 will be depressed to rock the arm 254 rearwardly and cause the dog 256 to impart a rotary movement to the ratchet wheel 257 and thus advance the platen.

The parts thus far mentioned are common to the L. C. Smith typewriter of the model shown. To adapt the typewriter for use with the calculating machine, it is necessary to add to it mechanism for automatically rendering ineffective its escapement mechanism; means for connecting the carriage of the typewriter to tabulating mechanism of the calculating machine; to incorporate a contrivance that will automatically restore the function of the typewriter escapement mechanism when the typewriter carriage has moved a predetermined distance; and to provide means for advancing or rotating the platen of the typewriter from mechanism of the calculating machine.

The mechanism for rendering ineffective the typewriter escapement, will first be described. In Figs. 9 and 30, there is shown a rocking frame 260, one end of which coöperates with that one of the escapement pawls of the typewriter which normally engages the wheel 232 and holds the carriage against movement. The opposite end of this frame has connection, through a link 261, with an arm 262 that is pivoted to the lower end of a bracket 263, which depends from the underneath side of the portion 214 of the typewriter frame. The frame 260 is pivoted upon a shaft 264 that is carried within brackets 265, and a spring 266 tends to hold the end of the frame 260 up out of contact with the escapement pawl. The effect is that when the rear end of the arm 262 is elevated and draws downward on the link 261, the frame 260 is rocked to cause its rear end to engage and depress the escapement pawl and remove it from the escapement wheel 232.

The tabulating mechanism of the calculating machine is adapted to be attached to the carriage of the typewriter through a bracket 269 and a link 270 (see Fig. 2), the free end of which is provided with a notch 271, adapted to receive the neck of a button 272 that extends from the rear side of the right hand end of the typewriter carriage (or the left hand end, as viewed in Fig. 2).

A splined shaft 275 (Fig. 2) is supported within brackets 276 which rise from the rear side of the top 277 of the typewriter. Collars 278 are adjustable along the shaft, and each is adapted to be fastened in any adjusted position longitudinally of the shaft, by means of a screw 279, the inner end of which enters the spline of the shaft. Each of the collars carries a finger 280 (see Fig. 9), for coöperation with a cam plate 281 (see Fig. 10), that is supported by the bracket 282 from the rail of the typewriter carriage 236. Where the shaft 275 projects beyond the left hand bracket 276, it has attached to it an arm 283, from the free end of which depends a rod 284. The rod is guided through an opening 285 (Fig. 10) in the portion 214 of the typewriter frame, and a collar 286, that is pinned or otherwise secured to the rod, serves to limit the downward movement of the rod by engagement with the frame of the typewriter.

Journaled within brackets 290, (Figs. 3, 9 and 19) which extend rearwardly from the base plate 1, are the ends of a bar 291 which constitutes one of the side members of a rectangular frame 292, the opposed side member being formed by a rod 293. The end members of the frame are preferably formed by turning down the ends of the rod 293, and such end members have applied to them the reference numeral 292. An intermediate longitudinal member 294 (Figs. 3 and 19) connects the end members of the frame, and projecting forwardly from the member 294 is a stud 295, for coöperation with a part of the calculating machine mechanism, as will be hereinafter explained. Arranged to embrace and traverse the member 293, is the hooked end of a member 296 (Figs. 9 and 19), which projects forwardly through a guiding aperture in a plate 297 that extends upward from the end of the typewriter carriage, and the forward end of the member 296 is pivoted, by means of the screw 298, to the upper end of the arm 254. It will be explained at this time that when the frame 292 is rocked rearwardly by the above mentioned mechanism of the calculating machine, it draws rearwardly on the member 296 and swings the arm 254 in a direction to advance the platen 222, through the intervention of the dog 256 and the ratchet 257.

*Tabulating mechanism.*

(Including parts 300 to 409.)

Journaled within a member 300 (Fig. 3) which is carried by the base plate 1, and spaced inward from its left hand end, is the left hand end of a bar 301 (Figs. 3 and 9), the opposite end of which is supported by a bracket 302. Journaled upon the rod 301 is a plurality of levers 303 which carry, at their outer ends, what will be referred to as the tabulating keys 304 (see Figs. 1, 3 and 9). It will be observed from Figs. 1 and 3, that the left hand key of the set bears an indication of two decimal places. The key next to it bears a single unit, the next represents a number of two orders, while the remaining keys progress toward the right at the rate of one order each.

Carried by the continually rotating shaft 34 (Figs. 3 and 9) are a number of clutches 305 wherewith the rear ends of the levers 303 coöperate, and which are practically duplicates of the main clutch already described. For the convenience of description, distinction will be made between the various clutches 305 by referring to them as clutches of the order represented by their respective keys. It will be understood that the levers 303 coöperate with the pawls of the various clutches to hold them normally, in inoperative position, but that, upon the depression of the keys, the rear ends of the levers will be withdrawn from the tails of the pawls, permitting the clutches to become locked to the shaft 34. The forward ends of the key levers 303 are elevated by springs 306 that are guided upon plungers 307, depending from the key levers.

Fastened to a shaft 310 (Figs. 3 and 9), that is journaled within the member 300 and the bracket 45, and passes through the end plate 16 and has its opposite end journaled within the intermediate plate 17, are a number of arms 311, there being one for each of the clutches 305, as will be seen from Fig. 3. Each of the arms projects alongside its respective clutch and is adapted to be engaged and swung by a pin 312 (see Figs. 3 and 9) that projects from the right hand side of the clutch. All of the arms 311 are of the same length, but are arranged at various angles with respect to the shaft 310. The right and left hand arms 311 are the greatest number of degrees apart, and the intermediate ones progress regularly about the shaft between the right and left hand arms. It will be explained, also, that the pins 312 may be arranged, progressively from one end of the series of clutches 305 to the other, at various radii, the pins which coöperate with the arm which normally reposes nearest the center of its respective cam, being located at the minimum radius from the shaft 34. By the foregoing arrangement it will be seen that, upon each rotation of a clutch 305, the shaft 310 will be oscillated to an extent dependent upon the angular arrangement of the particular arm whereby it is oscillated, and the radial location of the pin which rocks that arm. For instance, if the left hand tabulating key be depressed and its clutch 305 actuated, the shaft 310 will be rocked only a few degrees, while if the key at the opposite end of the series be depressed, the maximum degree of oscillation would be imparted to the shaft 310.

Fastened to the shaft 310, adjacent the intermediate plate 17, is a miter-gear segment 315 (Figs. 3 and 4), which meshes with a similar segment 316 fastened to a shaft 317, that is journaled in the brackets 318. A segment 319 (Figs. 2, 3 and 4), that is also fastened to the shaft 317, meshes with a pinion 320 which is journaled upon a stub-shaft carried by a bracket 321 (Fig. 3), supported by the intermediate plate 17. Rigid with the pinion 320 are a gear 322, spring drum 323, and a small pinion 324 (see Fig. 2). A spiral spring 325 is contained within the spring drum 323 and has one of its ends attached to the cylindrical wall of the drum, while its other end is fixed to the stub-shaft whereon the drum is mounted, in accordance with the usual arrangement of such parts of machines of this character. The spring tends to rotate the drum, and the gears and pinions attached thereto, in the direction indicated by the arrow in Fig. 2.

Guided between a pair of rails 328 (Fig. 2), located in the upper rear portion of the calculating machine, is what will be referred to as the escapement carriage 329. At its right hand end (left hand end in rear elevation, Fig. 2) the carriage has pivoted to it a pair of escapement pawls, indicated generally by the reference numeral 330. The escapement pawls 330 are identical to those shown and specifically described in my former application, and operate upon precisely the same principles as the escapement pawls or dogs of a typewriter, so it is deemed unnecessary, at this time, to describe and illustrate them in detail. A frame 331 depends from the carriage 329, and at its lower end is provided with a rack 332, which meshes with the pinion 324.

Arranged to coöperate with the pawls 330 are the lower ends of a series of adjustable stops 333 which are carried by what I will term the tabulating carriage 334 supported by the rails 335, through the balls 336 (see Fig. 6). It will be observed from Figs. 6 and 8, that the ends of the rails 335 are carried by arms 337, pivoted at 338, to the end plates of the calculating machine, so that said rails are capable of a slight up and down movement on an arc described from the axis of the pivots 338.

To prevent the pins 333 from becoming accidentally dislodged by the jar caused by the vertical movement of the carriage 334, said pins are provided with collars 339 (Fig. 6) which are adapted to be passed through the enlarged ends of key hole slots 340 of a sliding plate 341 (Fig. 1), supported from the upper side of the carriage, and occupy a position beneath the reduced ends of said slots, when said plate is moved in an appropriate direction.

Attention is called to a link 342 (see Fig. 8), that is pivoted to the left hand arm 337, and has its lower end pivotally connected to the free end of an arm 343 that is fastened to a shaft 344, located in the lower portion of the rear of the casing 5. A spring 345, which has one of its ends attached to the end plate 16, at 346, and its opposite end connected to the link 342, tends to elevate the link, and the arms which carry the rails of the tabulating carriage.

Between a pair of horizontal rails 350, that are located in the rear of the right hand end of the casing 5 (see Figs. 2, 7 and 14), is guided a carriage 351, which has connected to it a frame 352. The frame comprises a pair of side plates through which pass the shaft 50ª, and the forward ends of the side plates are spaced apart and connected by a block 353, which carries a roller 354, that is guided within a channel 355, supported by the front wall of the casing 5. Splined to each of the shafts 50ª, and located between the side plates 352, is a finger 356, for coöperation with the lower end of certain of the stops 105. By means of its carriage, the frame 352 is capable of movement along the shafts 50ª, so that the various fingers embraced by the frame may be moved to positions beneath the various banks of stops 105. The carriage of the frame 352 is moved in one direction by means of the previously described spring 325, through the gear 322, which meshes with the rack 357 of the carriage. To allow for the independent rotation of adjacent fingers 356, notwithstanding the nearness of the shafts 50ª, it will be noted that the adjacent fingers are offset laterally with respect to each other. Hence, the offset arrangement of the stops 105 already described.

The carriage 351 (Fig. 14) is equipped with a rack 358, having ratchet teeth for coöperation with the escapement pawls 359. The pawls are housed within a casing that is fastened to a rock shaft 360 (Fig. 14), that has its ends journaled within the end wall 7 and middle wall 9 of the casing 5. Where the shaft projects beyond the middle wall, it is provided with an arm 361 to the free end of which is loosely connected the end of an extension 362, of a plate 363 (see Figs. 8 and 14). The plate is slidably supported against a pair of brackets 364, which rise from the bottom 6 of the casing 5, by having screws 365 project through slots 366, within said brackets. The upper edge of the plate 363 (Fig. 8) is notched for the accommodation of the shafts 50ª, and each shaft, adjacent one side or the other of said plate, is provided with a cam 367, for coöperation with a pin 368 that projects from the side of the plate in the path of said cam. When any one of the shafts is rotated, therefore, it will be seen that its respective cam will engage one of the pins 368 and move the plate 363 rearwardly, causing it, through the arm 361, to rock the shaft 360, thereby actuating the escapement pawls 359, to allow the carriage of the frame 352 to advance one step, or the distance between adjacent teeth of the ratchet 358, under the influence of the spring 325.

It will be mentioned at this time, and explained fully later on, that prior to the depression of a tabulating key 304, the typewriter may be operated in the usual manner; but that, upon the depression of one of said keys, the typewriter carriage is immediately released, its escapement mechanism thrown out, and is dependent, for its movement, upon the tabulating carriage of the calculating machine.

When a tabulating key is depressed, its respective clutch 305 (Figs. 3 and 9) will be actuated, and through the engagement of the pin 312 of that clutch with the adjacent arm 311, the shaft 310 will be oscillated, and through the segments 315, 316 and 319, the pinion 320, with the gear 322 and the pinion 324, will be rotated a distance dependent upon the order or value of the tabulating key depressed. This operation, as above intimated, will throw out the escapement mechanism of the typewriter, and will shift the tabulating carriage of the calculating machine to the right, from a given point, a distance equal to the number of orders represented by the depressed tabulating key.

During the interim between the throwing out of the escapement mechanism of the typewriter carriage, and the time that the tabulating carriage of the calculating machine starts to shift, the typewriter carriage is free to move, under the influence of its actuating spring, to the left until its movement is arrested by the engagement of one of the stop pins 333 with the escapement pawl 330 of the tabulating carriage. It will be explained presently that through the operation of writing a number in the typewriter, and transmitting such number to the calculating machine, that the escapement mechanism of the carriage of the frame 352 will impart a step-by-step, or more definitely speaking an "order-by-order" movement to the said frame 352, and to the tabulating carriage 329, through which the same movement is imparted to the carriage of the typewriter.

It will be observed from Fig. 2 that a series of rocker arms 370 are pivoted, at 371, to a bracket 372 which depends from the bed plate 1. A guide 373 is provided for the right hand end of said arms, to keep them in proper position. Depending from each arm is a stop 374. Reposing beneath the opposite end of the arms 370 are the upturned ends of levers 375 (see Fig. 9), pivoted upon a bar 376, supported in any suitable manner from the frame of the machine. The forward ends of the levers 375 are arranged to be depressed by peripheral cams 377, of the clutches 305.

From Fig. 3 it will be seen that only the clutches of the "tens" to the "tens of thousands" order are equipped with cams 377. The reason of this will become obvious from the following explanation. When either the tens or the unit key is depressed, the carriage of the frame 352 is required to move only a slight distance, and the inertia of the frame, when said frame comes to a stop, will cause no undue strain upon the various gears and pinions. However, when the aforesaid carriage moves a distance determined by the depression of any key of greater value than the tens and units keys, there is sufficient momentum to the carriage to endanger the gears and racks, where its arrest is dependent thereon. For this reason, positive stops have been provided for the carriage of the frame 352, when the same is required to move more than two orders.

When either the tens, hundreds, thousands, or tens of thousands key is depressed, one of the levers 375 (Figs. 2 and 9) will be rocked by the appropriate cam 377 to elevate the left hand end of its respective rocker arm 370, and depress the stop 374 carried by the opposite end of said arm. When depressed, said stop is in the path of a head 378 (Figs. 2 and 14), that projects from the near end of the carriage 351. When the hundreds of thousands key is depressed, the middle wall 9 of the casing 5 forms a stop for the end of the carriage.

Each of the clutches 305 carries a cam lug 380 (Fig. 9) which projects from the side of the clutch opposite the pin 312. The lug 380 is arranged to engage an arm 381 which projects alongside the clutch and is fastened to a shaft 382, journaled in the member 300 (Fig. 2) and the bracket 45. Adjacent the bracket 45, the shaft has secured to it an arm 383 (Figs. 3 and 15) through which a clutch 384 is controlled. When any one of the clutches 305, therefore, is rotated, the clutch 384 will be operated.

As will be seen in Fig. 15, there is fastened to the previously mentioned shaft 344, an arm 385 which extends up alongside the clutch 384 and is adapted to be rocked by a pin 386, which extends from the left hand side of said clutch. Therefore, when the clutch is rotated, the shaft 344 will be oscillated through the arm 385. Upon the oscillation of the shaft 344, the arm 343 (Fig. 8) will be swung downward to depress the supporting rails of the tabulating carriage, through the link 342 and the arms 337. From this it will be seen that such carriage is in a position to allow its stop pins to coöperate with the escapement pawls of the carriage 329, only when a tabulating key has been depressed. Otherwise the typewriter carriage may move as usual, and simply carry the tabulating carriage of the calculating machine with it, by reason of its connection with such carriage through the link 270 (Figs. 2 and 4), and the bracket 269 of the tabulating carriage.

It will be explained that the stop pins 333 of the tabulating carriage may be distributed therealong to represent various vertical columns which it is desired to produce by the typewriter. When the figures in one column have been written, and it is desired to shift the carriage to the next column, another tabulating key is depressed. Upon the resulting operation of the clutch 384 (Figs. 3 and 15), mechanism will be actuated to operate the escapement pawls 330 (Fig. 2), to allow the tabulating carriage to shift to the next stop pin, and arrest the typewriter carriage at a point representing the first order of the desired column. The mechanism for accomplishing this will now be described.

Projecting from the right hand side of the clutch 384, is a pin 390, which is adapted to engage and rock an arm 391, fixed to the end of a shaft 392, that is journaled within the bracket 45, passes through the end wall 16 of the machine, and has its opposite end journaled within a bracket 393. Adjacent the last mentioned bracket, the shaft 392 has fastened to it a fork 394 (see Fig. 18) that embraces a short shaft 395, that is slidably supported within plates 396, carried by the end wall 16 of the machine. The shaft 395 is moved forwardly by a spring 397 which surrounds the shaft and bears, at its rear end, against one of the plates 396, and at its forward end, against a collar 398 that is fastened to the shaft. The fork 394 embraces the shaft just in front of the collar 398, and between it and the hub of a bifurcated arm 399.

The bifurcation of the arm 399 receives a pin 400, that is carried by a slide 401, supported within slotted studs 402, which depend from the top of the machine (see Fig. 18). The slide 401 is adapted to be manipulated by means of a handle 403, that projects through a slot 404 in the top of the machine. The rear end of the shaft 395 carries an L-shaped head 405, shown in perspective in Fig. 20. When the slide 401 is moved in one direction, it rocks the shaft 395 so that the lower branch of the head 405 is in alinement with the stud 295, projecting inward from the frame 292; and when the slide 401 is moved in the opposite direction, it shifts the head out of alinement with the stud 295, and locates the upper end of the head in a position to engage a finger 406, that is secured to a shaft 407 (see Fig. 5). The shaft 407, as will be observed from Fig. 16, is supported in brackets 408, that are connected to the inner sides of the rails 328, and by means of which said rails are supported from adjacent parts of the machine. From aforesaid Fig. 16 and from Fig. 4, it will be seen that the end of the shaft 407, remote from the finger 406, is turned upward to form a crank 409. This crank reposes directly back of the escapement dogs 330, and serves to operate the pawls, when said shaft is oscillated. From what has already been described, it will be seen that the shaft 395 will be reciprocated upon each actuation of the clutch 384; and, dependent upon the angular arrangement of the head 405, either the frame 292 will be moved, or the escapement pawls 330 will be actuated to allow the tabulating carriage, and the carriage of the typewriter, to assume a position for the production of a new column.

When it is desired simply to write and add a vertical column of numbers, the same may be accomplished by first shifting the operating handle 403 (Figs. 1, 18 and 19) to bring one branch of the head 405 into alinement with the stud 295 so that the frame 292 will be swung rearwardly upon each operation of the machine and consequential reciprocation of the head, and draw the member 296 (Figs. 9 and 19) in a corresponding direction to advance the platen through mechanism already described. Now by depressing a tabulating key representing the number of orders in the number next to be written, the calculating machine is operated (through connections later to be described) and the carriage of the frame 352, the escapement and tabulating carriages, and the carriage of the typewriter are moved to a position corresponding to the highest order of the selected number and their step-by-step movement, during the writing of the number, is controlled by the escapement mechanism of the carriage 351 (Fig. 14) of the frame 352. Under the arrangement of the head 405 above set forth, the escapement pawls 330 will remain idle thereby to hold the tabulating carriage of the calculating machine in a fixed relation to the typewriter carriage.

*Operating connections between the numeral keys of the typewriter and the stops of the calculating machine.*

(Parts 415 to 447.)

Fastened to the shaft 344, and spaced longitudinally thereof underneath the typewriter, is a pair of arms 415 (see Figs. 2, 3, 9, 10, 14 and 15), and to the upper end of each of these arms is pivoted the rear end of a beam 416. The opposite or forward end of each of the beams is pivotally connected to the upper end of an arm 417, precisely like the arm 415, and the lower ends of the arms 417 are pivoted at 418 to brackets 419, rising from the bottom 6 of the casing 5. Supported by the beam 416, is a plate 420, and a plate 421 of identical size and shape is spaced below and supported from the plate 420, by means of posts 422.

Located beneath each of the numeral key bars of the typewriter, and in a position to be engaged by said bar when the key is depressed, is a plunger 425 (Figs. 9 and 15), the lower end of which is guided in a pair of alining holes in the plates 420 and 421. Each plunger is normally retained in elevated position by means of a spring 426 which surrounds the reduced lower end of the plunger and is confined between the plate 421, and a collar 427 of the plunger, and which collar acts to limit the upward movement of the plunger, by engagement with the plate 420.

In fore-and-aft alinement with each of the plungers 425, is an operating lever 428 (Figs. 9 and 14) of one of the clutches 52, said clutches, as previously explained, being supported by the shafts 50 and located within the casing 5. Each of the levers 428 is supported from the bottom wall of the aforesaid casing, by a bracket 429, and a spring 430 tends to hold the lever in effective position with respect to its clutch. It is obvious from the fact that the arms 415 are fastened to the shaft 344, that the plungers 425 will be moved forward at each oscillation of the shaft; and a spring 431 (see Fig. 10), which has one of its ends attached to one of the arms 415, and its opposite end anchored to a part of the casing, acts to return the plunger carrying structure to normal position. When in such position, the plungers which coöperate with those levers 428 which extend rearwardly from their clutches, are in positions to clear the rear ends of the levers when said plungers are depressed, and those coöperating with the levers 428 which extend forwardly of their clutches, are in a position to project through holes 428$^a$ in the forward ends of said levers (Fig. 14). Therefore, when the parts are in normal position and the keys of the typewriter are depressed, they will have no effect upon the clutches 52; but, when a tabulating key has been depressed and results in the oscillation of the shaft 344, the plungers 425 will be moved slightly forward (see Fig. 14) so that those coöperating with the rearwardly extending levers will occupy positions directly above the rear ends of said levers, while those coöperating with the forwardly extending levers, will be moved out of alinement with the holes 428$^a$, and into positions to strike the ends of the levers forward of such holes.

Attention is recalled, at this time, to the clutch 54 (Fig. 10) through which the shaft 34 is operatively connected to the gear 47 that drives the shaft sections 50 through the gear 48 and pinions 51. The front edges of the plates 420 and 421 engage the arm 55 of the clutch 54 so that upon a forward movement of the plates the arm is withdrawn from the clutch and the clutch allowed to operate to transmit the rotation of the shaft 34 to the shaft sections 50. Now, to resume the former discussion, upon the depression of a numeral key of the typewriter, the corresponding clutch 52 will be actuated to couple the sections 50 and 50$^a$ of its respective shaft together. This done, the corresponding finger 356 (Figs. 7 and 14), that is splined to the right hand end of the shaft section 50$^a$, will be rotated to elevate a stop in one of the banks of the calculating machine, which corresponds, in value, to the depressed numeral key of the typewriter. As previously explained, the rotation of this shaft will actuate the escapement mechanism of the frame 352, and will cause said frame to move to a position under the next adjacent bank of stops.

This step-by-step movement of the frame 352, and the corresponding movement of the carriage of the typewriter, is intended to extend only to the number of orders represented by the tabulating key 304 which has been depressed. Therefore, when the frame 352 has moved such a distance, and the carriage of the typewriter a corresponding distance, it is desirable to have mechanism for automatically restoring the plunger carrying structure to normal position, so that the keys of the typewriter may be actuated without having any effect upon the calculating machine. This is accomplished by the contrivance comprising the parts 275 to 286, previously described, and the operation of which will now be explained.

As is clearly shown in Fig. 10, the lower end of the rod 284 reposes directly above a plunger 435, that is guided within an aperture in the overturned upper end of a bracket 436, which rises from the base plate 1. The lower end of the plunger is pivotally connected to the rear end of a rocker arm 437, that is fulcrumed to a bracket 438, rising from the bed plate. The forward end of the rocker arm is notched to form a shoulder 439, for engagement with a pin 440, on the left hand beam 416, of the supporting structure of the plunger 425. Under the influence of a spring 441, the forward end of the rocker arm 437 is depressed to cause the shoulder 439 to drop back of the pin 440, when the beam 416 is moved forward.

It will be seen from the foregoing, that, when one of the adjustable fingers 280 that is splined to the shaft 275 which, it will be understood, has been set to correspond to the units order of the column of numbers to be written, is engaged by the cam plate 281 of the typewriter carriage, said finger will be elevated to rock the shaft and depress the rod 284 and also the plunger 435. This will result in the elevation of the forward end of the rocker arm 437, and the release of the pin 440, so that the plunger supporting structure may be returned to normal position by the spring 431. This same operation may be accomplished, manually, by the depression of the special key 442 of the typewriter, the bar 443 of which engages the overturned upper end 444 of a lever 445, pivoted at 446 to a bracket 447, that rises from the base plate 1. The rear end of the lever reposes beneath the forward end of the rocker arm 437 and acts to elevate said arm when the forward end of the lever is depressed.

*Mechanism for performing addition.*
(Parts 450 to 460.)

Addition is accomplished by placing successive numbers in the calculating machine, either by depressing the manually operated keys, or by elevating the mechanical stops, and by operating the main clutch of the calculating machine after each number has been placed in the machine. During addition, therefore, the main clutch 80 may be manually actuated by the depression of what will be termed the "add" key. The "add" key is designated 450, and is located at the extreme right hand end of the machine (see Fig. 6); and where said key projects through the top of the machine, it is provided with a pin 451, which engages the forward end of an arm 452, that is secured to the shaft 90. It will be recalled that, to the opposite end of the shaft, just beyond the intermediate plate 17, there is fastened the arm 89 (Figs. 4 and 21) through which the main clutch 80 is actuated. Therefore, upon the depression of the "add" key, the arm 89 will be rocked away from the clutch, and the clutch will rotate with the shaft 25.

This same operation is mechanically performed when one of the tabulating keys 304 is depressed (Figs. 3 and 9). To the shaft 382, adjacent the end plate 16 of the calculating machine, there is splined a rocker arm 455 (Figs. 3 and 8), which carries a pin 456 at its forward end, and said pin normally occupies an aperture 457, somewhat larger than said pin, in the lower end of a depending link 458. The upper end of the link is pivoted to the forward end of an arm 459, fastened to the end of the shaft 90, where said shaft projects through the end plate 16. A spring 460 tends to elevate the forward end of the rocker arm 455. Upon the oscillation of the shaft 382, which results from the depression of one of the tabulating keys 304 and the subsequent operation of its clutch 305, as already explained, the forward end of the rocker arm 455 will be moved downward, to oscillate the shaft 90, through the arm 459 and the link 458, in a direction to withdraw the arm 89, from the main clutch 80.

*Mechanism for accomplishing subtraction.*
(Parts 465 to 511.)

It is fully explained in my former application above identified, that subtraction is accomplished by first placing a number, the minuend, in the machine by depressing the appropriate numeral keys and then operating the main clutch by means of the "add" key, thereafter placing a number in the machine which represents the subtrahend, and following up this operation by depressing the "subtraction" key, which results, as pointed out in the aforesaid application, in the longitudinal shifting of a certain shaft which is incorporated in the transmission mechanism or gearing between the indicating wheels of the calculating machine and the key and stop-controlled racks whereby said wheels are rotated. The shifting of the aforesaid shaft has the effect of reversing the transmission gearing, and results in rotating the indicating wheels in a direction opposite to that in which they are rotated in the performance of addition.

The longitudinally shiftable shaft is shown at 465, particularly in Figs. 6, 7 and 31, and between the plates 16 and 17 the shaft has loosely mounted upon it a pair of pinions 466 and 467, the opposed hubs of which have recesses $466^a$ and $467^a$, respectively. A pin 468, which projects from the side of the shaft 465, is arranged to occupy either one or the other of said notches, when the shaft is in one or the other of its extreme positions. The shaft is moved toward the right hand end of the machine, with its pin 468 in the notch of the pinion 467, by means of a spring 469, confined between the plate 17 and a collar 470 that is pinned to the shaft. It will be explained, briefly, that the gears 466 and 467 are driven in opposite directions through appropriate gearing, fully disclosed in my former application, and these gears indirectly drive the "tens-carrying" mechanism of the indicating wheels and effect a reversal of such mechanisms to correspond to the direction of rotation of said wheels in the reverse operation of addition and subtraction. This matter is fully treated in my former application.

Mounted upon the end of the continually rotating shaft 28, adjacent the right hand end plate 15 of the calculating machine, is a clutch 475 (see Fig. 6). The operating lever of the clutch is shown at 476, and is pivoted at 477, to the adjacent side plate of the machine. The forward end of the lever is engaged by a pin 478, that projects laterally from the forwardly turned lower end of the stem 479, of the "subtracting" key 480. The key is elevated by a spring 481, and its upward movement is limited by a stop 482 of the key stem, which engages the top of the machine. 483 is an arm that is fastened to the shaft 90 and projects down alongside the clutch 475 in a position to have its inclined, lower end engaged and cammed aside by a pin 484, that projects from the side of the clutch 475, when said clutch rotates. From this it will be seen that when the "subtracting" key is depressed, and the clutch 475 is actuated, said clutch will, through its pin 484 and the arm 483, oscillate the shaft 90 to actuate the main clutch 80.

The end of the cylindrical wall 485 (Figs. 6 and 7) of the clutch, is notched at 486, one side of said notch being inclined to act as a cam against a roller 487, that normally reposes in the notch and is carried by the outer end of an arm 488, fastened to the rear end of an inclined shaft 489, that is journaled within the brackets 490 which are carried by the end plate of the machine. The forward end of the shaft 489 is provided with a finger 491, the free end of which reposes alongside a collar 492, that is fastened to the shaft 465. Upon the rotation of the clutch 475, therefore, the shaft 489 will be oscillated to slide the shaft 492, as previously described, against the tension of its spring 469.

Attention is now called to what will be termed the "auxiliary subtraction" key 495 (Figs. 3, 33 and 34), that is fastened to the forward end of a short shaft 496, journaled within the brackets 497 which rise from a plate 498, that is fastened to the front of the base 1, between the typewriter and the calculating machine. An arm 499 depends from the rear end of the shaft 496, and has a pin 500, which occupies a bifurcation in the upturned end 501 of a lever 502, that is pivoted at 503 to the base plate of the machine. The rear end of the lever is notched for the reception of a pin 504, that extends downward from the hub of the rocker arm 455 (see Fig. 8). Therefore, by depressing the "auxiliary subtraction" key, the lever 502 is rocked upon its pivot to cause its rear end to shift the rocker arm 455 longitudinally of the shaft 383. When shifted in this manner, the pin 456 of the rocker arm is withdrawn from the enlarged hole 457 of the depending link 458, and the rear end of the rocker arm is projected beneath a pin 505, that projects laterally from an arm 506, that is fastened to a shaft 507, journaled in brackets 508, which rise from the base plate 1, adjacent its rear edge. The shaft 507 extends to the right hand end of the machine, where it has secured to it an arm 509 (see Figs. 3 and 6). The forward end of the arm 509 has connection, through the link 510, with the rear end of the lever 476. A spring 511 tends to depress the rear end of the lever 476. Now, when the shaft 382 is oscillated in the manner previously described, and elevates the rear end of the rocker arm 455, it will cause, through the parts just described, the operation of the clutch 475, to cause the machine to perform the operation of subtraction.

Inasmuch as multiplication and division are mere elaborations upon the respective operations of addition and subtraction, and in view of the further facts that they are thoroughly explained in my former application, and the mechanism whereby they are accomplished constitutes no part of my present invention except as it has been developed to fit into the general combination of typewriter and calculating machine, it is deemed unnecessary to discuss the aforesaid operations here.

It may be mentioned, however, in this connection, that in both multiplication and division, the counter is utilized in the first instance, to indicate the multiplier or, in other words, the number of times the given number has been added to itself; and in the second instance, to show the quotient, or the number of times one number is contained in the other, or, in the language of subtraction, how many times one number may be subtracted from the successive remainders of a given quantity.

*Escapement mechanism of the calculating machine carriage.*

(Parts 515 to 542.)

The escapement mechanism of the calculating machine carriage, shown in detail in Figs. 24, 25 and 26, differs somewhat from that disclosed in my former application.

Supported by a bracket 515 (see Fig. 3), which extends inward from the intermediate plate 17, is a spring drum 516, inclosing a spring 517, one end of which is secured to the drum and the other to the stud 518, upon which the drum is journaled. A suitable tape or band 519 is attached to and is adapted to be wound upon the periphery of the drum, and the opposite end of the tape is secured to the calculating machine carriage, referred to generally by the reference numeral 520. The carriage is provided with a rack 521, which meshes with a pinion 522, fastened to the upper end of a shaft 523. Fastened to the shaft, near its lower end, is an escapement wheel 524, which coöperates with the escapement dogs 525, similar to those previously referred to in connection with other parts of the machine. The dogs are carried within a suitable casing fastened to the rock shaft 526, that is journaled within the frame of the machine.

At the right hand end of the machine, between the "add" and "subtraction" keys is a "space" key 528 (Fig. 6), the stem of which is guided within the frame of the machine, a spring 529 being used to elevate the key, the upward movement of which is arrested by a pin 530 that is arranged to engage the top plate of the machine. A pin 531, that projects laterally from the lower end of the stem of the "space" key, engages the free end of a lever 532, that is fastened to a shaft 533, supported in and between the plates 15 and 17. Adjacent the plate 17, an arm 534 (shown in dotted lines in Fig. 4) is secured to and depends from the shaft, and its lower end is connected, by a link 535, to the lower end of an arm 536, that is fastened to the shaft 526. When the space key is depressed, it will, through the above mechanism, oscillate the shaft 526 to actuate the escapement mechanism of the calculating machine carriage, in a well known manner. When it is desired to free the carriage and allow it to move to its extreme left hand position under the influence of the spring 517, the same may be accomplished by depressing what is referred to as the "tabulating" key 537 (Figs. 4 and 24), the stem 538 of which is guided within the casing of the machine and within a bracket 539 which depends therefrom, the key being elevated by a spring 540. A pin 541 extends from the side of the key stem, adjacent its lower end, and engages an arm 542 that is fastened to the shaft 526. Upon the depression of the tabulating key, the shaft is rocked a sufficient distance to remove the pawls 525 entirely away from the escapement wheel 524, and the carriage is thus free to move.

The same brake as that disclosed in my former application for controlling the speed at which the drum 517 may rotate is incorporated in my present machine.

*Calculating machine casing.*

(Parts 550 to 560.)

The parts of the calculating machine above described are inclosed in a casing 550 (Fig. 1), which casing is adapted to be placed down over the foregoing parts with its lower edge resting upon the edge of the base plate. The casing is provided with a series of openings 551 through which one of the sets of indicating wheels of the machine may be observed, and another series of openings 552 are provided for the other set of indicating wheels. Supported from the casing, between the aforesaid series of openings, is a rod 553, which carries a pair of slidable indicating fingers 554, used, if desired, to point off the numbers into decimals or the like. A similar pointer or indicating finger 555, is guided upon a rod 556, supported from the casing, in front of a series of openings 557, through which the indicating wheels of the counter may be observed. A pointer 558 projects up from a part of the calculating machine carriage through and traverses a slot 559 of the casing, and coöperates with a scale 560, that bears numbered graduations corresponding to the various positions assumed by the carriage in its step-by-step movements.

Attention is recalled to the fact that only one set of the indicating wheels of the calculating machine carriage coöperate with the mechanical clearing device or mechanism that is under the control of the "clear" key. To clear the other set of wheels, a crank 565 (Fig. 1) is provided, whereby the shaft of said wheels may be rotated. Therefore, as totals are found and then mechanically cleared from the rear set of indicating wheels of the calculating machine, the sum of such totals, or the so called grand total may be allowed to accumulate on the forward set of indicating wheels.

Having thus described my invention, what I claim is:—

1. The combination, with a typewriter, of a calculating machine having indicating devices and a plurality of movable stops for controlling the indicating devices, a member for moving each of the stops into effective position, driving means, and a coupling device for operatively connecting each of the aforesaid members to said driving means, each coupling device being adapted to be actuated by one of the typewriter keys.

2. The combination, with a typewriter, of a calculating machine having indicating devices and a plurality of movable stops for controlling the indicating devices, a member for moving each of the stops into effective position, driving means, a coupling device for operatively connecting each of the aforesaid members to said driving means, and an actuating member for each coupling device that is adapted to be operated by one of the typewriter keys.

3. The combination, with a typewriter, of a calculating machine having indicating devices and a plurality of keys that are adapted to be manually operated for controlling the movement of the indicating devices, a plurality of movable stops also for controlling said indicating devices, a member for moving each of the stops into effective position, driving means, a coupling device for operatively connecting each of the aforesaid members to said driving means, and an actuating member for each coupling device that is adapted to be operated by one of the typewriter keys.

4. The combination, with a typewriter, of a calculating machine having indicating devices and a plurality of movable stops for controlling the indicating devices, a member for moving each of the stops into effective position, driving means, a coupling device for operatively connecting each of the aforesaid members to said driving means, an actuating member for each coupling device, a shiftable frame, plungers carried by said frame, one for coöperation with each of the numeral keys of the typewriter and with one of the aforesaid actuating members, and means for shifting said frame to move the plungers into and out of effective position.

5. The combination, with a typewriter, of a calculating machine having indicating devices and a plurality of banks of movable stops for controlling the indicating devices, a series of members for moving said stops into effective position, mechanism controlled by certain of the typewriter keys for actuating said members, a frame wherewith said members are shiftable transversely of the banks of stops, mechanism for intermittently shifting said frame successively from one to the other of the banks, and connections through which the movements of said frame are transmitted to the typewriter carriage.

6. The combination, with a typewriter, of a calculating machine having indicating devices and a plurality of banks of movable stops for controlling the indicating devices, a series of members for moving said stops into effective position, mechanism controlled by certain of the typewriter keys for actuating said members, a frame wherewith said members are shiftable transversely of the banks of stops, mechanism for intermittently shifting said frame successively from one to the other of the banks, connections through which the movements of the frame are transmitted to the typewriter carriage, and means whereby the frame is automatically moved to the banks of stops representing the highest order of a given number, and whereby the typewriter platen is line spaced.

7. The combination, with a typewriter, of a calculating machine having indicating devices and a plurality of banks of movable stops for controlling the indicating devices, the distance between adjacent banks of stops differing from the usual transverse spacing of the typewriter carriage, a series of members for moving the stops into effective position, mechanism controlled by certain of the typewriter keys for actuating said members, a frame wherewith said members are shiftable transversely of the banks of stops, mechanism for intermittently shifting said frame successively from one to the other of the banks, and differential transmission mechanism between the frame and the typewriter carriage whereby the carriage is moved according to its normal transverse spacing by said frame as it is moved from bank to bank.

8. The combination, with a typewriter, of a calculating machine having indicating devices and a plurality of banks of movable stops for controlling the indicating devices, the distance between adjacent banks of stops differing from the usual transverse spacing of the typewriter carriage, a series of members for moving the stops into effective position, mechanism controlled by certain of the typewriter keys for actuating said members, a frame wherewith said members are shiftable transversely of the banks of stops, mechanism for intermittently shifting said frame successively from one to the other of the banks, differential transmission mechanism between the frame and typewriter carriage whereby the carriage is moved according to its normal transverse spacing by said frame as it is moved from bank to bank, and means whereby the frame is automatically moved to the bank of stops which corresponds to the highest order of a given number, and whereby the typewriter platen is line spaced.

9. The combination, with a typewriter, of a calculating machine having indicating devices and a plurality of movable stops for controlling the movements of the indicating devices, a shaft rotatably supported in operative relation to said stops, a finger slidably but non-rotatably mounted upon said shaft for coöperation with the stops, means for shifting the finger along the shaft into operative relation to various stops, driving means for said shaft, and a coupling device for operatively connecting said shaft to said driving means, said device being adapted to be operated by one of the keys of the typewriter.

10. The combination, with a typewriter, of a calculating machine having indicating devices and a plurality of banks of movable stops for controlling the movements of the indicating devices, a base whereon the typewriter and the calculating machine are supported, a plurality of shafts supported within said base, a finger slidably but non-rotatably mounted upon each shaft for coöperation with the corresponding stops of the respective banks, means for shifting the fingers from bank to bank, driving means for said shafts, a coupling device for operatively connecting each shaft to said driving means, and an actuating member for each coupling device that is adapted to be operated by one of the keys of the typewriter.

11. The combination, with a typewriter, of a calculating machine having indicating devices and a plurality of banks of movable stops for controlling the movements of the indicating devices, a base whereon the typewriter and the calculating machine are supported, a plurality of shafts supported within said base, a finger slidably but non-rotatably mounted upon each shaft for coöperation with the corresponding stops of the respective banks, means for shifting the fingers along the shafts from bank to bank, driving means for said shafts, a coupling device for operatively connecting each shaft to said driving means, an actuating member for each coupling device, a shiftable frame, plungers carried by said frame one for coöperation with each of the aforesaid actuating members and with one of the keys of the typewriter, and means for shifting said frame to move the plungers into and out of effective position.

12. The combination with a typewriter, of a calculating machine having indicating devices and a plurality of banks of movable stops for controlling the movement of the indicating devices, a finger for moving the corresponding stops of the respective banks into effective position, a plurality of shafts whereon said fingers are slidably but non-rotatably mounted, a frame shiftable along said shafts for moving said fingers successively from one to the other of the banks, means for propelling the frame longitudinally of the aforesaid shafts, an escapement mechanism for said frame whereby it is allowed to move intermittently to shift the fingers from bank to bank, means for actuating said escapement mechanism, driving means, and a coupling device for operatively connecting each shaft to the driving means, said device being adapted to be operated by one of the keys of the typewriter.

13. The combination, with a typewriter, of a calculating machine having indicating devices and a plurality of banks of movable stops for controlling the movement of the indicating devices, a finger for moving the corresponding stops of the respective banks into effective position, a plurality of shafts whereon said fingers are slidably but non-rotatably mounted, a frame shiftable along said shafts for moving said fingers successively from one to the other of the banks, transmission mechanism between said frame and the carriage of the typewriter, means for propelling the frame longitudinally of the aforesaid shafts, an escapement mechanism for said frame whereby it is allowed to move intermittently to shift the fingers from bank to bank, means carried by the aforesaid shafts for actuating said escapement mechanism, driving means, a coupling device for operatively connecting each shaft to the driving means, and an actuating member for each coupling device that is adapted to be operated by one of the keys of the typewriter.

14. The combination, with a typewriter, of a calculating machine having indicating devices and a plurality of banks of movable stops for controlling the movement of the indicating devices, a finger for moving the corresponding stops of the respective banks into effective position, a plurality of shafts whereon said fingers are slidably but non-rotatably mounted, a frame shiftable along said shafts for moving said fingers successively from one to the other of the banks, transmission mechanism between said frame and the carriage of the typewriter, means for propelling the frame longitudinally of the aforesaid shafts, an escapement mechanism for said frame whereby it is allowed to move intermittently to shift the fingers from bank to bank, means carried by the aforesaid shafts for actuating said escapement mechanism, driving means, a coupling device for operatively connecting each shaft to the driving means, mechanism for shifting the aforesaid frame in opposition to its propelling means to move the fingers into a position for coöperation with the bank of stops corresponding to the highest order of a given number, a coupling device for operatively connecting said mechanism to the driving means, and an actuating member for said coupling device.

15. The combination, with a typewriter, of a calculating machine having indicating devices and a plurality of banks of movable stops for controlling the movement of the indicating devices, a finger for moving the corresponding stops of the respective banks into effective position, a plurality of shafts whereon said fingers are slidably but non-rotatably mounted, a frame shiftable along said shafts for moving said fingers successively from one to the other of the banks, transmission mechanism between said frame and the carriage of the typewriter, means for propelling the frame longitudinally of the aforesaid shafts, an escapement mechanism for said frame whereby it is allowed to move intermittently to shift the fingers from bank to bank, means carried by the aforesaid shafts for actuating said escapement mechanism, driving means, a coupling device for operatively connecting each shaft to the driving means, mechanism for shifting the aforesaid frame in opposition to its propelling means to move the fingers into a position for coöperation with the bank of stops corresponding to the highest order of a given number and for line spacing the platen of the typewriter, a coupling device for operatively connecting said mechanism to the driving means, and an actuating member for said coupling device.

16. The combination, with a typewriter, of a calculating machine having indicating devices and a plurality of movable stops for controlling the indicating devices, a base whereon said calculating machine is mounted and whereby the typewriter is removably supported, a plurality of shafts supported by said base, a member carried by each shaft for engaging and moving one of the stops into effective position, driving means, a coupling device for operatively connecting each shaft to said driving means, an actuating member for each coupling device, a frame movably supported by said base, plungers carried by said frame, means for shifting said frame to move the plungers into and out of member-engaging position, and means for locating the typewriter upon the base with certain of its keys in operative relation to the aforesaid plungers.

17. The combination, with a typewriter, of a calculating machine having indicating devices and a plurality of movable stops for controlling the movements of the indicating devices, mechanism for operating said indicating devices, members for moving the aforesaid stops into effective position, a driven element, coupling devices for operatively connecting the aforesaid members and said driven element, each of the devices being adapted to be actuated by one of the keys of the typewriter, driving means for the operating mechanism of the calculating machine, a clutch for operatively connecting the driving means and the aforesaid driven element, and an actuating member for said clutch.

18. The combination, with a typewriter, of a calculating machine having indicating devices, a power driven element for operating the calculating machine, governing mechanism for the indicating devices of the calculating machine that is adapted to be controlled by certain of the typewriter keys, and a device for operatively connecting the governing mechanism and the aforesaid driven element.

19. In a calculating machine, the combination of a carriage, guides supporting said carriage, means for propelling said carriage in a given direction along the guides, a rack supported by the carriage, a pinion wherewith said rack meshes, a shaft to which said pinion is fastened, a ratchet wheel secured to the shaft, a pair of escapement pawls, a supporting member for said pawls, a rock shaft to which said supporting member is attached, means for rocking said shaft to move first one and then the other of said escapement pawls into coöperation with the ratchet wheel, and additional means for rocking the aforesaid shaft to remove both escapement pawls from coöperation with the ratchet wheel.

20. In a computing machine, the combination of a shiftable carriage, a supporting member carried thereby, a series of indicating wheels rotatably mounted upon said supporting member, mechanism for rotating the wheels independently of each other to produce various combinations of indications, driving means for said mechanism, mechanism supported by the carriage for moving the indicating wheels to normal position, said mechanism involving an actuating member, a driving head therefor, said actuating member and the driving head having portions which interlock when the carriage is moved to a given position, and transmission gearing between the driving head and the aforesaid driving means.

21. A calculating machine comprising a series of indicating devices, means for actuating and limiting the movement of each indicating device during each operation of the machine, mechanism for moving the indicating devices, a driving element, a coupling device for operatively connecting said mechanism and driving element, an actuating member for said coupling device whereby said driving element may be caused to actuate said mechanism any desired number of times, a counter comprising a series of indicating wheels for registering the number of operations of said mechanism, mechanism for returning the indicating wheels of the counter to normal position, a coupling device for operatively connecting said mechanism and the driving element, and an actuating member for the last mentioned coupling device.

22. The combination with a typewriter, of a calculating machine having indicating devices and movable stops for controlling the indicating devices, a power shaft, means for actuating said stops, and means including the numeral keys of the typewriter for connecting said actuating means with the power shaft.

23. The combination with a typewriter, of a calculating machine having indicating devices and a plurality of movable stops for controlling the indicating devices, a series of members corresponding to the numeral keys of the typewriter for moving the stops into effective position, driving means and a coupling device for operatively connecting each of the aforesaid members to said driving means, each coupling device being adapted to be actuated by one of the typewriter numeral keys.

24. The combination with a typewriter, of a calculating machine having indicating devices and a plurality of movable stops for controlling said indicating devices, a series of members for actuating said movable stops, shiftable means interposed between said actuating members and the numeral keys of the typewriter whereby said movable stops may be controlled by the numeral keys, and means for shifting said shiftable means into operative position.

25. The combination with a typewriter, of a calculating machine having indicating devices and a plurality of movable stops for controlling the indicating devices, means for actuating said movable stops, means controlling said actuating means comprising shiftable plungers interposed between the numeral keys of the typewriter and the actuating means, and means for shifting the plungers to an operative position.

26. The combination with a typewriter, of a calculating machine having indicating devices and a plurality of movable stops for controlling said indicating devices, actuating means for each of said movable stops comprising a coupling device, an actuating member for the coupling device, a shiftable frame, a plunger carried by said frame and adapted to be interposed between the coupling device and the corresponding numeral key of the typewriter, and means for shifting the frame to move the plunger into and out of effective position.

27. The combination with a typewriter, of a calculating machine having indicating devices and a plurality of banks of movable stops for controlling the indicating devices, a series of members for moving said stops into effective position, mechanism controlled by certain of the typewriter keys for actuating said members, a frame wherewith said members are shiftable transversely of the banks of stops, and mechanism for intermittently shifting said frame successively from one to the other of the banks.

28. The combination with a typewriter, of a calculating machine having indicating devices and a plurality of banks of movable stops for controlling the indicating devices, a series of members for moving said stops into effective position, a driving means, a coupling device for operatively connecting each of the aforesaid members to said driving means, a shiftable frame, plungers carried by said frame for controlling the coupling devices, said plungers being adapted to be interposed between the numeral keys of the typewriter and said coupling devices, means for shifting said frame to move the plungers into and out of effective position, means for intermittently shifting said members from one to the other of the banks, and connections through which the transverse movements of the members are transmitted to the typewriter carriage.

29. The combination with a typewriter, of a calculating machine having indicating devices and a plurality of banks of movable stops for controlling the indicating devices, a series of members for moving said stops into effective position, mechanism controlled by the numeral keys of the typewriter for actuating said members, a frame wherewith said members are shiftable transversely of the banks of stops, and means whereby said frame may be automatically moved to any one of said banks of stops.

30. The combination with a typewriter, of a calculating machine having indicating devices and a plurality of banks of movable stops for controlling the indicating devices, a series of members for moving said stops into effective position, mechanism controlled by the typewriter keys for actuating said members, a frame wherewith said members are shiftable transversely of the banks of stops, means whereby said frame may be automatically moved to any one of said banks of stops, and mechanism for intermittently shifting said frame successively from one to the other of the banks.

31. The combination with a typewriter, of a calculating machine having indicating devices and a plurality of banks of movable stops for controlling the indicating devices, a series of members for moving said stops into effective position, mechanism controlled by the typewriter keys for actuating said members, a frame wherewith said members are shiftable transversely of the banks of stops, means whereby said frame may be automatically moved to any one of said banks of stops, mechanism for intermittently shifting said frame successively from one to the other of the banks, and connections through which the intermittent movements of the frame are transmitted to the typewriter carriage.

32. The combination with a typewriter, of a calculating machine having indicating devices and a plurality of banks of movable stops for controlling the indicating devices, a series of members for moving said stops into effective position, mechanism controlled by the numeral keys of the typewriter for actuating said members, a frame wherewith said members are shiftable transversely of the banks of stops, mechanism controlled by said members for intermittently shifting said frame successively from one to the other of the banks, and means whereby the frame may be automatically moved to any one of the banks of stops and whereby the typewriter platen is column spaced.

33. The combination with a typewriter, of a calculating machine having indicating devices and a plurality of banks of movable stops for controlling the indicating devices, a series of members for moving said stops into effective position, mechanism controlled by the numeral keys of the typewriter for actuating said members, a frame wherewith said members are shiftable transversely of the banks of stops, means whereby the frame may be automatically moved to any one of said banks of stops, and selective means under the control of the operator whereby the typewriter platen may be either line or column spaced when the movement of said frame to said bank of stops takes place.

34. The combination with a typewriter, of a calculating machine having indicating devices and a plurality of banks of movable stops for controlling the indicating devices, a series of members for moving said stops into effective position, mechanism controlled by the numeral keys of the typewriter for actuating said members, a frame wherewith said members are shiftable transversely of the banks of stops, means whereby the frame may be automatically shifted to any one of the banks of stops, and mechanism under the control of the numeral keys and said members for intermittently shifting said frame successively from one bank representing an order of a given number to a bank of lower order.

35. The combination with a typewriter, of a calculating machine having indicating devices and a plurality of banks of movable stops for controlling the indicating devices, a series of members for moving said stops into effective position, driving means for actuating said members, shiftable controlling means adapted to be interposed between the numeral keys of the typewriter and said driving means, a frame wherewith said members are shiftable transversely of the banks of stops, and means whereby said frame may be automatically moved to any one of said banks of stops and whereby said controlling means is simultaneously shifted into operative position between said numeral keys and said driving means.

36. The combination with a typewriter, of a calculating machine having indicating devices and a plurality of banks of movable stops for controlling the indicating devices, a series of members for moving said stops into effective position, driving means for actuating said members, shiftable controlling means adapted to be interposed between the numeral keys of the typewriter and said driving means, a frame wherewith said members are shiftable transversely of the banks of stops, means whereby said frame may be automatically moved to any one of said banks of stops and whereby said controlling means is simultaneously shifted into operative position between said numeral keys and said driving means, and mechanism under the control of said members for intermittently shifting said frame from one to the other of said banks.

37. The combination with a typewriter, of a calculating machine having indicating devices and a plurality of banks of movable stops for controlling the indicating devices, a series of members for moving said stops into effective position, driving means for actuating said members, shiftable controlling means adapted to be interposed between the numeral keys of the typewriter and said driving means, a frame wherewith said members are shiftable transversely of the banks of stops, and means whereby said frame may be automatically moved to any one of said banks of stops and whereby said controlling means is simultaneously shifted into operative position between said numeral keys and said driving means, mechanism for intermittently shifting said frame from one bank to another, and connections through which the movements of the frame are transmitted to the typewriter carriage.

38. The combination with a typewriter, of a calculating machine having indicating devices and a plurality of banks of movable stops for controlling the indicating devices, a series of members for moving said stops into effective position, driving means for actuating said members, shiftable controlling means adapted to be interposed between the numeral keys of the typewriter and said driving means, a frame wherewith said members are shiftable transversely of the banks of stops, and means whereby said frame may be automatically moved to any one of said banks of stops and whereby said controlling means is simultaneously shifted into operative position between said numeral keys and said driving means, and selective means under the control of the operator whereby the typewriter platen may be either line or column spaced when the movement of the frame to the predetermined bank of stops takes place.

39. The combination with a typewriter, of a calculating machine having indicating devices and a plurality of banks of movable stops for controlling the indicating devices, a series of members for moving said stops into effective position, driving means, coupling devices for operatively connecting each of the aforesaid members to said driving means, an actuating member for each coupling device, a shiftable frame, plungers carried by said frame, one for coöperation with each of the numeral keys of the typewriter and with the aforesaid actuating members, a second frame wherewith said stop moving members are shiftable transversely of the banks of stops, and means whereby said second frame may be automatically moved to any one of the banks of stops and whereby simultaneously therewith said first named shiftable frame is shifted into operative position.

40. The combination with a typewriter, of a calculating machine having indicating devices and a plurality of banks of movable stops for controlling the indicating devices, a series of members for moving said stops into effective position, driving means, coupling devices for operatively connecting each of the aforesaid members to said driving means, an actuating member for each coupling device, a shiftable frame, plungers carried by said frame, one for coöperation with each of the numeral keys of the typewriter and with the aforesaid actuating members, a second frame wherewith said stop moving members are shiftable transversely of the banks of stops, means whereby said second frame may be automatically moved to any one of the banks of stops and whereby simultaneously therewith said first whereby simultaneously therewith said first named shiftable frame is shifted into operative position, and mechanism under the control of said stop moving members for intermittently shifting said second frame successively from one to the other of said banks.

41. The combination with a typewriter, of a calculating machine having indicating devices and a plurality of banks of movable stops for controlling the indicating devices, a series of members for moving said stops into effective position, driving means, coupling devices for operatively connecting each of the aforesaid members to said driving means, an actuating member for each coupling device, a shiftable frame, plungers carried by said frame, one for coöperation with each of the numeral keys and with the aforesaid actuating members, a second frame wherewith said stop moving members are shiftable transversely of the banks of stops, means whereby said second frame may be automatically moved to any one of a bank of stops and whereby simultaneously therewith said first named shiftable frame is shifted into operative position, mechanism under the control of said stop moving members for intermittently shifting said second frame successively from one to the other of said banks, and connections through which the intermittent movements of said frame are transmitted to the typewriter carriage.

42. The combination with a typewriter, of a calculating machine having indicating devices and a plurality of banks of movable stops for controlling the indicating devices, a series of members for moving said stops into effective position, driving means, coupling devices for operatively connecting each of the aforesaid members to said driving means, an actuating member for each coupling device, a shiftable frame, plungers carried by said frame, one for coöperation with each of the numeral keys and with the aforesaid actuating members, a second frame wherewith said stop moving members are shiftable transversely of the banks of stops and means whereby said second frame may be automatically moved to any one of the banks of stops and whereby simultaneously therewith said first named shiftable frame is shifted into operative position, and selective means under the control of the operator whereby the typewriter platen may be either line or column spaced when the movement to the predetermined bank of stops takes place.

43. The combination with a typewriter, of a calculating machine having indicating means and a plurality of banks of movable devices for controlling the indicating means, a series of members for moving said devices into effective position, mechanism controlled by the numeral keys of the typewriter for actuating said members, a frame wherewith said members are shiftable transversely of the banks of movable devices, means whereby the frame may be automatically moved to any one of the banks of devices, and stops automatically interposed in the path of said frame whereby the frame may be positively stopped at the predetermined position.

44. The combination with a typewriter, a calculating machine having indicating means and a plurality of banks of movable devices for controlling the indicating means, a series of members for moving said devices into effective position, mechanism controlled by the numeral keys of the typewriter for actuating said members, a frame wherewith said members are shiftable transversely of the banks of movable devices, means whereby the frame may be automatically moved to any one of the banks of devices, and positive stops automatically and momentarily interposed in the path of said frame whereby the frame may be positively stopped at the predetermined position.

45. The combination with a typewriter, of a calculating machine having indicating means and a plurality of banks of movable devices for controlling the indicating means, a series of members for moving said devices into effective position, mechanism controlled by the numeral keys of the typewriter for actuating said members, a frame wherewith said members are shiftable transversely of the banks of devices, means including a driving shaft and clutch whereby said frame may be shifted to any one of said banks of devices, a plurality of normally inoperative stops corresponding to certain of said banks and adapted to be interposed in advance of said frame, and means for momentarily actuating the stop corresponding to the predetermined bank of devices when the movement of the frame to said predetermined bank takes place.

46. The combination with a typewriter, of a calculating machine having indicating means and a plurality of banks of movable devices for controlling the indicating means, a series of members for moving said devices into effective position, mechanism controlled by the numeral keys of the typewriter for actuating said members, a frame wherewith said members are shiftable transversely of the banks of devices, a rock shaft oscillatable through varying angles to shift said frame along its path, means including a clutch and a cam for rocking said oscillatable shaft whereby said frame may be shifted to a predetermined bank of devices, and a stop controlled by said clutch for positively stopping said frame at the required bank of devices.

47. The combination with a typewriter, of a calculating machine having indicating means and a plurality of banks of movable devices for controlling the indicating means, a series of members for moving said devices into effective position, mechanism controlled by the numeral keys of the typewriter for actuating said members, a frame wherewith said members are shiftable transversely of the banks of devices, means including a clutch for shifting said frame to a predetermined bank of devices, a stop which is normally inactive but adapted to be momentarily interposed in the path of said frame, and actuating means interposed between said stop and said clutch.

48. The combination with a typewriter, of a calculating machine having indicating devices and a plurality of movable stops for controlling the indicating devices, a member for moving each of the stops into effective position, driving means, a coupling device for operatively connecting each of the aforesaid members to said driving members, an actuating member for each coupling device, a shiftable frame, plungers carried by said frame, one for coöperation with each of the numeral keys of the typewriter and with one of the aforesaid actuating members, means for shifting said frame to move the plungers into effective position, and means for shifting said frame to an inoperative position, said last means being thrown into operation when the typewriter carriage reaches a predetermined point.

49. The combination with a typewriter, of a calculating machine having indicating devices and a plurality of movable stops for controlling the indicating devices, a member for moving each of the stops into effective position, driving means, a coupling device for operatively connecting each of the aforesaid members to said driving means, an actuating member for each coupling device, a shiftable frame, plungers carried by said frame, one for coöperation with each of the numeral keys of the typewriter and with one of the aforesaid actuating members, said frame being normally biased to inoperative position, means for shifting said frame to move and lock the plungers into operative position, a tripping means for said lock, and an adjustable means interposed between the typewriter carriage and said tripping means, whereby said frame may be automatically returned to inoperative position upon the carriage of the typewriter reaching a predetermined point in its travel.

50. The combination with a typewriter, of a calculating machine having indicating devices and a plurality of movable stops for controlling the indicating devices, a series of members for moving said stops into effective position, driving means, mechanism controlled by the numeral keys of the typewriter for connecting said driving means with said members, said mechanism comprising a frame adapted to be shifted into and out of effective position, means for shifting said frame to operative position, and means actuated by the typewriter carriage at a predetermined point in its travel for returning the frame to inoperative position.

51. The combination with a typewriter, of a calculating machine having indicating devices and a plurality of movable stops for controlling the indicating devices, a member for moving each of the stops into effective position, driving means, a coupling device between said driving means and each of said members, mechanism interposed between said coupling device and numeral keys of the typewriter whereby said members may be actuated through the control of said numeral keys, means for shifting said mechanism into effective position, means controlled by said numeral keys for intermittently moving the typewriter carriage along its path of travel, and means operative when the carriage reaches a predetermined point in its travel for returning said mechanism to inoperative position.

52. The combination with a typewriter, of a calculating machine having indicating devices and a plurality of banks of movable stops for controlling the indicating devices, a series of members for moving said stops into effective position, mechanism controlled by the numeral keys of the typewriter for actuating said members, a frame wherewith said members are shifted transversely of banks of stops, means whereby said frame may be automatically moved to any one of the banks of stops, means whereby simultaneously therewith the escapement mechanism of the typewriter carriage is rendered inoperative and whereby the typewriter carriage is connected for movement with the said frame, and mechanism under the control of said numeral keys for intermittently shifting said frame successively from one to the other of the banks.

53. The combination with a typewriter, of a calculating machine having indicating devices and a plurality of banks of movable stops for controlling the indicating devices, a series of members for moving said stops into effective position, mechanism controlled by certain of the typewriter keys for actuating said members, a frame wherewith said members are shifted transversely of the stops, means whereby the frame may be automatically moved to any one of the banks of stops, means for rendering inoperative the escapement mechanism of the typewriter carriage and simultaneously therewith connecting the carriage with the said frame for movement therewith, and mechanism under the control of the numeral keys of the typewriter for shifting said frame and carriage successively from one to the other of the banks.

54. The combination with a typewriter, of a calculating machine having indicating devices and a plurality of movable stops for controlling the indicating devices, a member for moving each of the stops into effective position, mechanism controlled by the numeral keys of the typewriter for actuating said members, means for moving said members to a position to operate a predetermined series of stops, means under control of the aforesaid means for rendering inoperative the escapement mechanism of the typewriter carriage and simultaneously therewith connecting the carriage with the tabulating carriage of the calculating machine, and mechanism under the control of the numeral keys for intermittently shifting said tabulating carriage and said typewriter carriage intermittently along their paths.

55. The combination with a typewriter, of a calculating machine having indicating devices and a plurality of movable stops for controlling the indicating devices, said movable stops being biased toward the inoperative position, a member for moving and locking each of the stops in effective position, mechanism controlled by the numeral keys of the typewriter for actuating said members, and means for shifting said members in a position to actuate any of said stops, and simultaneously therewith releasing the stops previously locked in position.

56. The combination with a typewriter, of a calculating machine having indicating devices and a plurality of banks of movable stops for controlling the indicating devices, a series of members for moving and locking said stops in effective position, said stops being biased toward the inoperative position, mechanism controlled by the numeral keys of the typewriter for actuating said members, a frame wherewith said members are shifted transversely of the banks of stops, means whereby the frame is automatically moved to any one of said banks of stops, and means under control of said last means for releasing any stops previously locked in operative position.

In testimony whereof, I hereunto affix my signature in the presence of two witnesses.

ADOLPHUS S. DENNIS.

Witnesses:
E. W. WYATT,
ELVA FINEMAN.